(12) United States Patent
Newman

(10) Patent No.: US 11,034,335 B2
(45) Date of Patent: Jun. 15, 2021

(54) LOW-PROFILE IMAGING SYSTEM WITH ENHANCED VIEWING ANGLES

(71) Applicant: NIO USA, Inc., San Jose, CA (US)

(72) Inventor: Austin L. Newman, San Jose, CA (US)

(73) Assignee: NIO USA, Inc., San Jose, CA (US)

( * ) Notice: Subject to any disclaimer, the term of this patent is extended or adjusted under 35 U.S.C. 154(b) by 891 days.

(21) Appl. No.: 15/394,402

(22) Filed: Dec. 29, 2016

(65) Prior Publication Data

US 2018/0011173 A1  Jan. 11, 2018

Related U.S. Application Data

(60) Provisional application No. 62/424,976, filed on Nov. 21, 2016.

(51) Int. Cl.
*G01C 3/08* (2006.01)
*B60S 1/56* (2006.01)
(Continued)

(52) U.S. Cl.
CPC ............. *B60S 1/56* (2013.01); *B08B 1/00* (2013.01); *B08B 3/02* (2013.01); *B08B 5/02* (2013.01);
(Continued)

(58) Field of Classification Search
CPC ............ H04N 5/2251; H04N 5/22521; H04N 5/22525; H04N 5/2258; B60S 1/56;
(Continued)

(56) References Cited

U.S. PATENT DOCUMENTS 3,297,395 A * 1/1967 Dardarian ................. F41G 7/34
359/196.1
5,546,188 A * 8/1996 Wangler ................... G08G 1/04
356/5.01
(Continued)

FOREIGN PATENT DOCUMENTS

WO  WO 2014/054124  4/2014

OTHER PUBLICATIONS

Davies, "This NIO EP9 performance EV wants to be the Tesla of Supercars," SlashGear, 2016, retrieved from https//www.slashgear.com/nextev-nio-ep9-car-tesla-of-performance-evs-21464829, 9 pages.
(Continued)

*Primary Examiner* — Samantha K Abraham
(74) *Attorney, Agent, or Firm* — Sheridan Ross P.C.

(57) ABSTRACT

Methods, devices, and systems of a light imaging and ranging system are provided. In particular, the imaging and ranging system includes a LIDAR sensor and a low-profile optics assembly having a reflective element with a continuous and uninterrupted reflective surface surrounding a periphery of a LIDAR sensor in a light path of the LIDAR sensor. The reflective element is positioned at a distance offset from the periphery of the LIDAR sensor and directs light emitted by the LIDAR sensor to a second reflective element that is substantially similar in shape and size as the reflective element. The second reflective element is arranged above and opposite the reflective element directing the light emitted by the LIDAR sensor to a sensing environment outside the imaging and ranging system.

20 Claims, 11 Drawing Sheets

(51) Int. Cl.

| | |
|---|---|
| *G02B 27/00* | (2006.01) |
| *G01S 7/497* | (2006.01) |
| *B08B 5/02* | (2006.01) |
| *B08B 3/02* | (2006.01) |
| *B08B 1/00* | (2006.01) |
| *B60S 1/48* | (2006.01) |
| *G01S 17/931* | (2020.01) |
| *B08B 7/02* | (2006.01) |
| *B60S 1/08* | (2006.01) |
| *B60S 1/54* | (2006.01) |

(52) U.S. Cl.
CPC ............ *B08B 7/028* (2013.01); *B60S 1/0818* (2013.01); *B60S 1/485* (2013.01); *B60S 1/54* (2013.01); *G01S 7/497* (2013.01); *G01S 17/931* (2020.01); *G02B 27/0006* (2013.01); *G01S 2007/4977* (2013.01)

(58) Field of Classification Search
CPC .......... B60S 1/485; B60S 1/0818; B60S 1/54; G01S 17/931; G01S 7/497; G01S 2007/4977; G01S 7/4802; G01S 17/894; G01S 7/4865; G01S 7/4863; G01S 17/10; G02B 27/0006; B08B 5/02; B08B 3/02; B08B 1/00; B08B 7/028
See application file for complete search history.

(56) References Cited

U.S. PATENT DOCUMENTS

| | | | | |
|---|---|---|---|---|
| 6,304,321 | B1* | 10/2001 | Wangler | G01S 17/18 356/4.01 |
| 6,861,660 | B2* | 3/2005 | Almogy | G01N 21/956 250/559.45 |
| 7,021,704 | B2* | 4/2006 | Ortega Martinez | B62D 25/06 296/187.13 |
| 7,838,836 | B2 | 11/2010 | Robert et al. | |
| 9,449,561 | B1 | 9/2016 | Umansky et al. | |
| 10,101,457 | B1* | 10/2018 | Topliss | G02B 26/101 |
| 2002/0140924 | A1* | 10/2002 | Wangler | G08G 1/04 356/28 |
| 2005/0024625 | A1* | 2/2005 | Mori | G01S 17/42 356/4.01 |
| 2006/0171704 | A1 | 8/2006 | Bingle et al. | |
| 2007/0181810 | A1* | 8/2007 | Tan | G01S 7/4811 250/341.1 |
| 2008/0165323 | A1* | 7/2008 | Eisenberg | A61B 3/1225 351/219 |
| 2008/0309949 | A1* | 12/2008 | Rueb | G01S 7/4812 356/614 |
| 2009/0274478 | A1 | 11/2009 | Kang | |
| 2011/0242286 | A1 | 10/2011 | Pace et al. | |
| 2011/0298656 | A1 | 12/2011 | Bechler | |
| 2012/0257196 | A1* | 10/2012 | Raicu | G02B 21/002 356/300 |
| 2013/0099943 | A1 | 4/2013 | Subramanya | |
| 2013/0105264 | A1 | 5/2013 | Ruth | |
| 2013/0245877 | A1 | 9/2013 | Ferguson et al. | |
| 2014/0071425 | A1* | 3/2014 | Dunne | G01C 15/002 356/4.01 |
| 2014/0078514 | A1* | 3/2014 | Zhu | G01S 17/10 356/606 |
| 2014/0204373 | A1* | 7/2014 | Mazzio | G01J 3/0291 356/301 |
| 2014/0232869 | A1 | 8/2014 | May et al. | |
| 2015/0009296 | A1 | 1/2015 | Crona | |
| 2015/0009485 | A1* | 1/2015 | Mheen | G01S 17/87 356/4.01 |
| 2015/0266489 | A1 | 9/2015 | Solyom et al. | |
| 2015/0309165 | A1 | 10/2015 | Elwart et al. | |
| 2015/0310281 | A1 | 10/2015 | Zhu et al. | |
| 2016/0001330 | A1 | 1/2016 | Romack et al. | |
| 2016/0047903 | A1* | 2/2016 | Dussan | G01S 17/87 356/5.01 |
| 2016/0061433 | A1* | 3/2016 | Chou | F21V 29/004 362/235 |
| 2016/0170203 | A1 | 6/2016 | Weigert et al. | |
| 2016/0176384 | A1 | 6/2016 | Dissette et al. | |
| 2016/0236725 | A1* | 8/2016 | Shirai | B62D 35/00 |
| 2016/0272164 | A1 | 9/2016 | Hsiao et al. | |
| 2016/0320471 | A1 | 11/2016 | Preussner | |
| 2017/0059695 | A1 | 3/2017 | Fetterman et al. | |
| 2017/0115387 | A1 | 4/2017 | Luders et al. | |
| 2017/0190300 | A1* | 7/2017 | Maranville | B60R 9/04 |
| 2017/0210304 | A1 | 7/2017 | Davies et al. | |
| 2017/0259789 | A1 | 9/2017 | Mcandrew | |
| 2017/0269196 | A1 | 9/2017 | Millar et al. | |
| 2017/0349147 | A1 | 12/2017 | Blank | |
| 2017/0369039 | A1 | 12/2017 | Rousseau | |
| 2018/0031706 | A1* | 2/2018 | Delp | G01S 17/936 |
| 2018/0037268 | A1* | 2/2018 | Moore | G01S 7/4813 |
| 2018/0115693 | A1 | 4/2018 | Matsushima | |
| 2018/0126921 | A1 | 5/2018 | Koseki | |
| 2018/0128901 | A1 | 5/2018 | Pointer et al. | |
| 2018/0143298 | A1* | 5/2018 | Newman | B62D 15/00 |
| 2018/0354467 | A1 | 12/2018 | Glickman et al. | |

OTHER PUBLICATIONS

Kautonen, "NextEV unveils the NIO EP9 electric supercar in London," Autoblog, 2016, retrieved from http://www.autoblog.com/2016/11/21/nextev-unveiles-the-nio-ep9-electric-supercar-in-london/, 3 pages.
White, "NextEV's NIO IP9 is an incredible four-wheel-rive electric hypercar," WIRED, 2016, retrieved from http://www.wired.co.uk/article/nextev-hypercar-nio-ep9, 6 pages.
U.S. Appl. No. 15/394,425, filed Dec. 29, 2016, Newman.
U.S. Appl. No. 15/394,419, filed Dec. 29, 2016, Newman.
International Search Report and Written Opinion for International (PCT)Patent Application No. PCT/US17/62700, dated Mar. 5, 2018, 11 pages.
Final Action for U.S. Appl. No. 15/394,425, dated Jan. 31, 2019, 24 pages.
Official Action for U.S. Appl. No. 15/394,419, dated Nov. 26, 2018, 11 pages.
Official Action for U.S. Appl. No. 15/394,425, dated Sep. 13, 2018, 28 pages.
Official Action for U.S. Appl. No. 15/394,419, dated Aug. 3, 2018 7 pages, Restriction Requirement.
International Preliminary Report on Patentability for International (PCT) Patent Application No. PCT/US17/62700, dated May 31, 2019, 10 pages.
Notice of Allowance for U.S. Appl. No. 15/394,425, dated May 13, 2019, 11 pages.
Final Action for U.S. Appl. No. 15/394,419, dated Apr. 25, 2019, 11 pages.

* cited by examiner

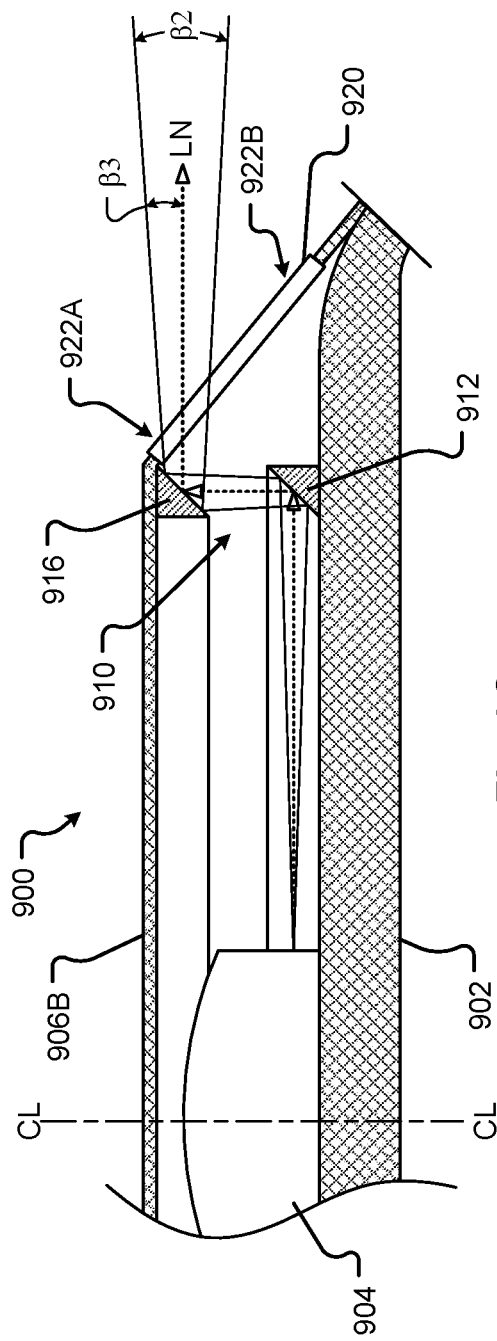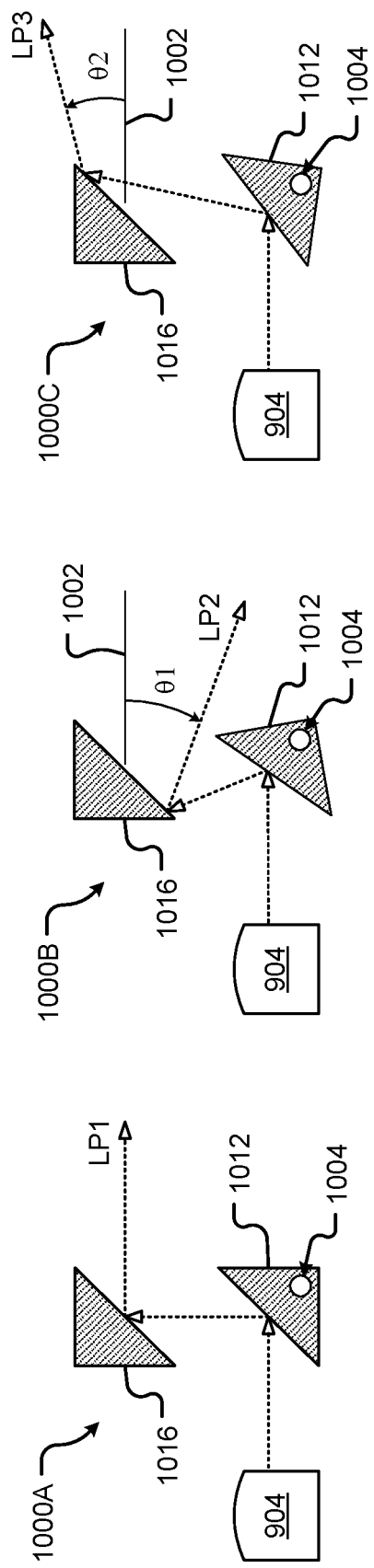
Fig. 9C
Fig. 10C
Fig. 10B
Fig. 10A

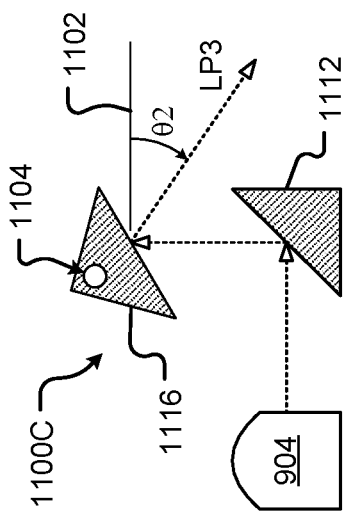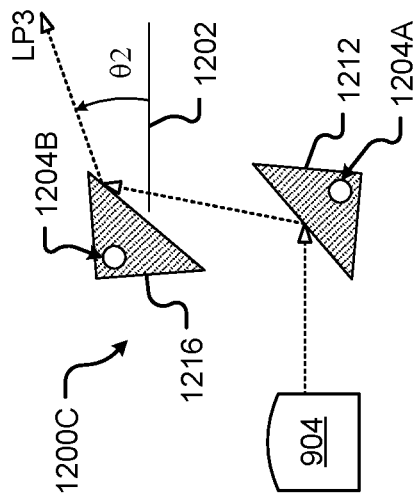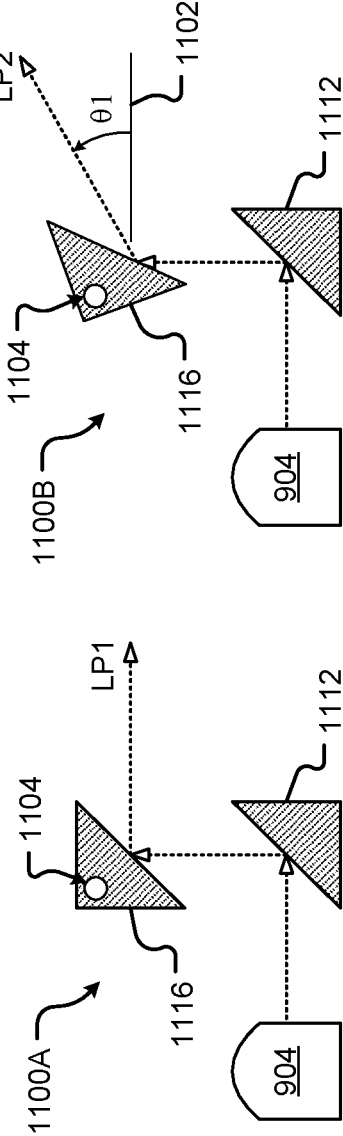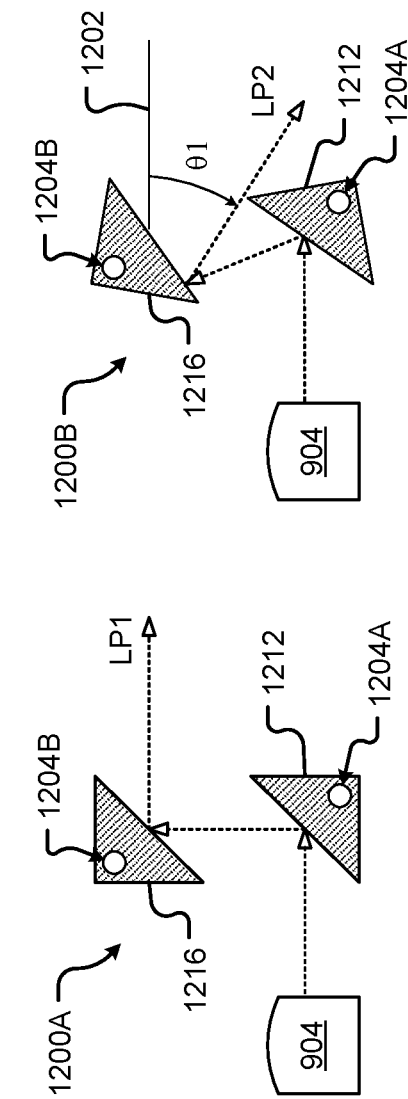
Fig. 11A  Fig. 11B  Fig. 11C
Fig. 12A  Fig. 12B  Fig. 12C

LOW-PROFILE IMAGING SYSTEM WITH ENHANCED VIEWING ANGLES

CROSS REFERENCE TO RELATED APPLICATIONS

The present application claims the benefits of and priority, under 35 U.S.C. § 119(e), to U.S. Provisional Application Ser. No. 62/424,976, filed on Nov. 21, 2016, entitled "Next Generation Vehicle," which is hereby incorporated by reference, in its entirety, for all that it teach and for all purposes.

FIELD

The present disclosure is generally directed to vehicle systems, in particular, toward electric and/or hybrid-electric vehicles.

BACKGROUND

In recent years, transportation methods have changed substantially. This change is due in part to a concern over the limited availability of natural resources, a proliferation in personal technology, and a societal shift to adopt more environmentally friendly transportation solutions. These considerations have encouraged the development of a number of new flexible-fuel vehicles, hybrid-electric vehicles, and electric vehicles.

While these vehicles appear to be new they are generally implemented as a number of traditional subsystems that are merely tied to an alternative power source. In fact, the design and construction of the vehicles is limited to standard frame sizes, shapes, materials, and transportation concepts. Among other things, these limitations fail to take advantage of the benefits of new technology, power sources, and support infrastructure.

BRIEF DESCRIPTION OF THE DRAWINGS

FIG. 9C is a detail view of a portion of the cross-sectional view of FIG. 9B showing an optics assembly of the low-profile imaging system in accordance with embodiments of the present disclosure;

FIG. 10A is a first schematic view of an optics assembly of the low-profile imaging system in accordance with embodiments of the present disclosure;

FIG. 10B is a second schematic view of an optics assembly of the low-profile imaging system in accordance with embodiments of the present disclosure;

FIG. 10C is a third schematic view of an optics assembly of the low-profile imaging system in accordance with embodiments of the present disclosure;

FIG. 11A is a first schematic view of an optics assembly of the low-profile imaging system in accordance with embodiments of the present disclosure;

FIG. 11B is a second schematic view of an optics assembly of the low-profile imaging system in accordance with embodiments of the present disclosure;

FIG. 11C is a third schematic view of an optics assembly of the low-profile imaging system in accordance with embodiments of the present disclosure;

FIG. 12A is a first schematic view of an optics assembly of the low-profile imaging system in accordance with embodiments of the present disclosure;

FIG. 12B is a second schematic view of an optics assembly of the low-profile imaging system in accordance with embodiments of the present disclosure;

FIG. 12C is a third schematic view of an optics assembly of the low-profile imaging system in accordance with embodiments of the present disclosure.

DETAILED DESCRIPTION

Embodiments of the present disclosure will be described in connection with a vehicle, and in some embodiments, an electric vehicle, rechargeable electric vehicle, and/or hybrid-electric vehicle and associated systems.

Figure 1:
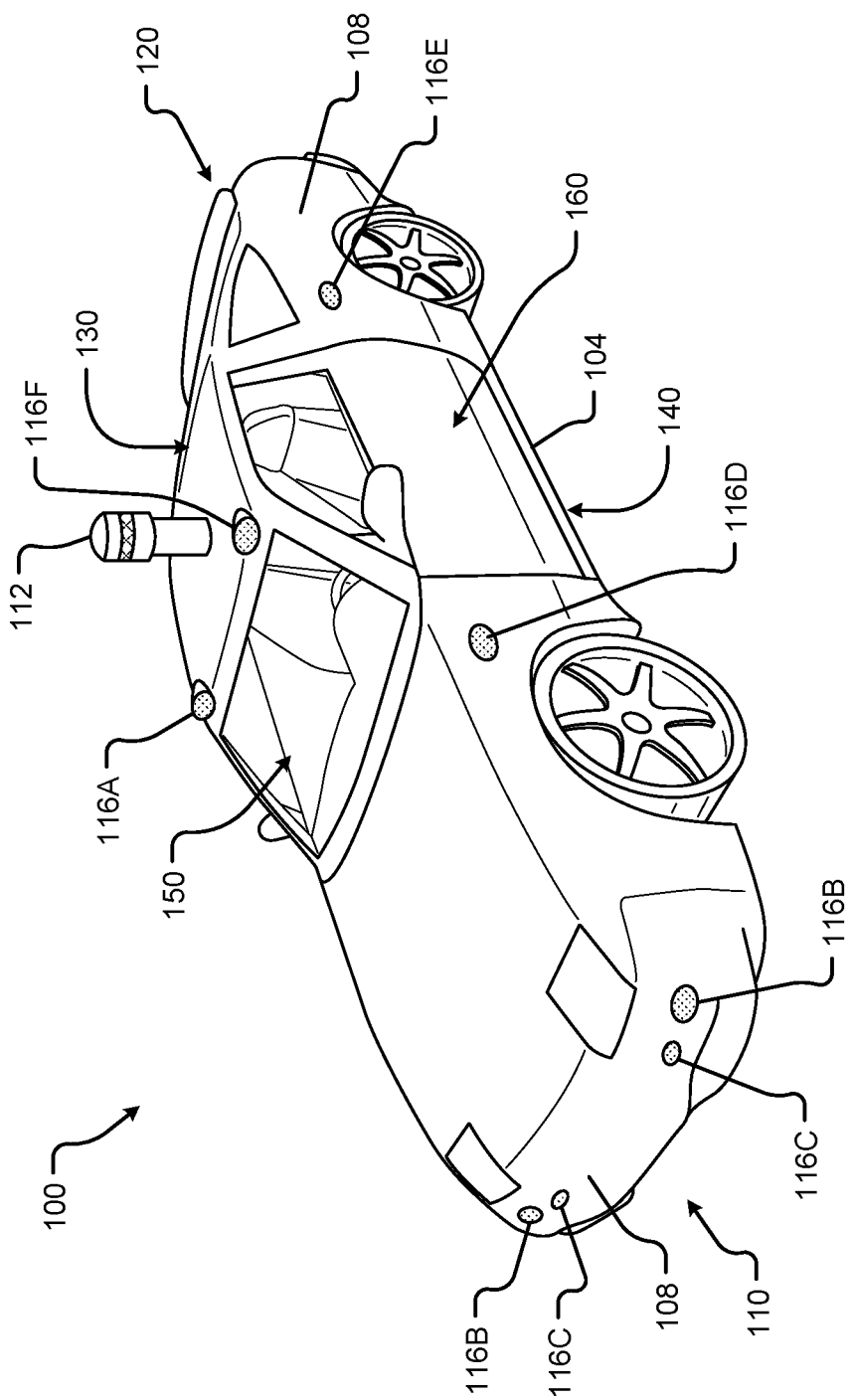
FIG. 1 shows a vehicle in accordance with embodiments of the present disclosure.

FIG. 1 shows a perspective view of a vehicle 100 in accordance with embodiments of the present disclosure. The electric vehicle 100 comprises a vehicle front 110, vehicle aft or rear 120, vehicle roof 130, at least one vehicle side 160, a vehicle undercarriage 140, and a vehicle interior 150. In any event, the vehicle 100 may include a frame 104 and one or more body panels 108 mounted or affixed thereto. The vehicle 100 may include one or more interior components (e.g., components inside an interior space 150, or user space, of a vehicle 100, etc.), exterior components (e.g., components outside of the interior space 150, or user space, of a vehicle 100, etc.), drive systems, controls systems, structural components, etc.

Although shown in the form of a car, it should be appreciated that the vehicle 100 described herein may include any conveyance or model of a conveyance, where the conveyance was designed for the purpose of moving one or more tangible objects, such as people, animals, cargo, and the like. The term "vehicle" does not require that a conveyance moves or is capable of movement. Typical vehicles may include but are in no way limited to cars, trucks, motorcycles, busses, automobiles, trains, railed conveyances, boats, ships, marine conveyances, submarine conveyances, airplanes, space craft, flying machines, human-powered conveyances, and the like.

In some embodiments, the vehicle 100 may include a number of sensors, devices, and/or systems that are capable of assisting in driving operations. Examples of the various sensors and systems may include, but are in no way limited to, one or more of cameras (e.g., independent, stereo, combined image, etc.), infrared (IR) sensors, radio frequency (RF) sensors, ultrasonic sensors (e.g., transducers, transceivers, etc.), RADAR sensors (e.g., object-detection sensors and/or systems), LIDAR systems, odometry sensors and/or devices (e.g., encoders, etc.), orientation sensors (e.g., accelerometers, gyroscopes, magnetometer, etc.), navigation sensors and systems (e.g., GPS, etc.), and other ranging, imaging, and/or object-detecting sensors. The sensors may be disposed in an interior space 150 of the vehicle 100 and/or on an outside of the vehicle 100. In some embodiments, the sensors and systems may be disposed in one or more portions of a vehicle 100 (e.g., the frame 104, a body panel, a compartment, etc.).

The vehicle sensors and systems may be selected and/or configured to suit a level of operation associated with the vehicle 100. Among other things, the number of sensors used in a system may be altered to increase or decrease information available to a vehicle control system (e.g., affecting control capabilities of the vehicle 100). Additionally or alternatively, the sensors and systems may be part of one or more advanced driver assistance systems (ADAS) associated with a vehicle 100. In any event, the sensors and systems may be used to provide driving assistance at any level of operation (e.g., from fully-manual to fully-autonomous operations, etc.) as described herein.

The various levels of vehicle control and/or operation can be described as corresponding to a level of autonomy associated with a vehicle 100 for vehicle driving operations. For instance, at Level 0, or fully-manual driving operations, a driver (e.g., a human driver) may be responsible for all the driving control operations (e.g., steering, accelerating, braking, etc.) associated with the vehicle. Level 0 may be referred to as a "No Automation" level. At Level 1, the vehicle may be responsible for a limited number of the driving operations associated with the vehicle, while the driver is still responsible for most driving control operations. An example of a Level 1 vehicle may include a vehicle in which the throttle control and/or braking operations may be controlled by the vehicle (e.g., cruise control operations, etc.). Level 1 may be referred to as a "Driver Assistance" level. At Level 2, the vehicle may collect information (e.g., via one or more driving assistance systems, sensors, etc.) about an environment of the vehicle (e.g., surrounding area, roadway, traffic, ambient conditions, etc.) and use the collected information to control driving operations (e.g., steering, accelerating, braking, etc.) associated with the vehicle. In a Level 2 autonomous vehicle, the driver may be required to perform other aspects of driving operations not controlled by the vehicle. Level 2 may be referred to as a "Partial Automation" level. It should be appreciated that Levels 0-2 all involve the driver monitoring the driving operations of the vehicle.

At Level 3, the driver may be separated from controlling all the driving operations of the vehicle except when the vehicle makes a request for the operator to act or intervene in controlling one or more driving operations. In other words, the driver may be separated from controlling the vehicle unless the driver is required to take over for the vehicle. Level 3 may be referred to as a "Conditional Automation" level. At Level 4, the driver may be separated from controlling all the driving operations of the vehicle and the vehicle may control driving operations even when a user fails to respond to a request to intervene. Level 4 may be referred to as a "High Automation" level. At Level 5, the vehicle can control all the driving operations associated with the vehicle in all driving modes. The vehicle in Level 5 may continually monitor traffic, vehicular, roadway, and/or environmental conditions while driving the vehicle. In Level 5, there is no human driver interaction required in any driving mode. Accordingly, Level 5 may be referred to as a "Full Automation" level. It should be appreciated that in Levels 3-5 the vehicle, and/or one or more automated driving systems associated with the vehicle, monitors the driving operations of the vehicle and the driving environment.

As shown in FIG. 1, the vehicle 100 may, for example, include at least one of a ranging and imaging system 112 (e.g., LIDAR, etc.), an imaging sensor 116A, 116F (e.g., camera, IR, etc.), a radio object-detection and ranging system sensors 116B (e.g., RADAR, RF, etc.), ultrasonic sensors 116C, and/or other object-detection sensors 116D, 116E. In some embodiments, the LIDAR system 112 and/or sensors may be mounted on a roof 130 of the vehicle 100. In one embodiment, the RADAR sensors 116B may be disposed at least at a front 110, aft 120, or side 160 of the vehicle 100. Among other things, the RADAR sensors may be used to monitor and/or detect a position of other vehicles, pedestrians, and/or other objects near, or proximal to, the vehicle 100. While shown associated with one or more areas of a vehicle 100, it should be appreciated that any of the sensors and systems 116A-K, 112 illustrated in FIGS. 1 and 2 may be disposed in, on, and/or about the vehicle 100 in any position, area, and/or zone of the vehicle 100.

Figure 2:
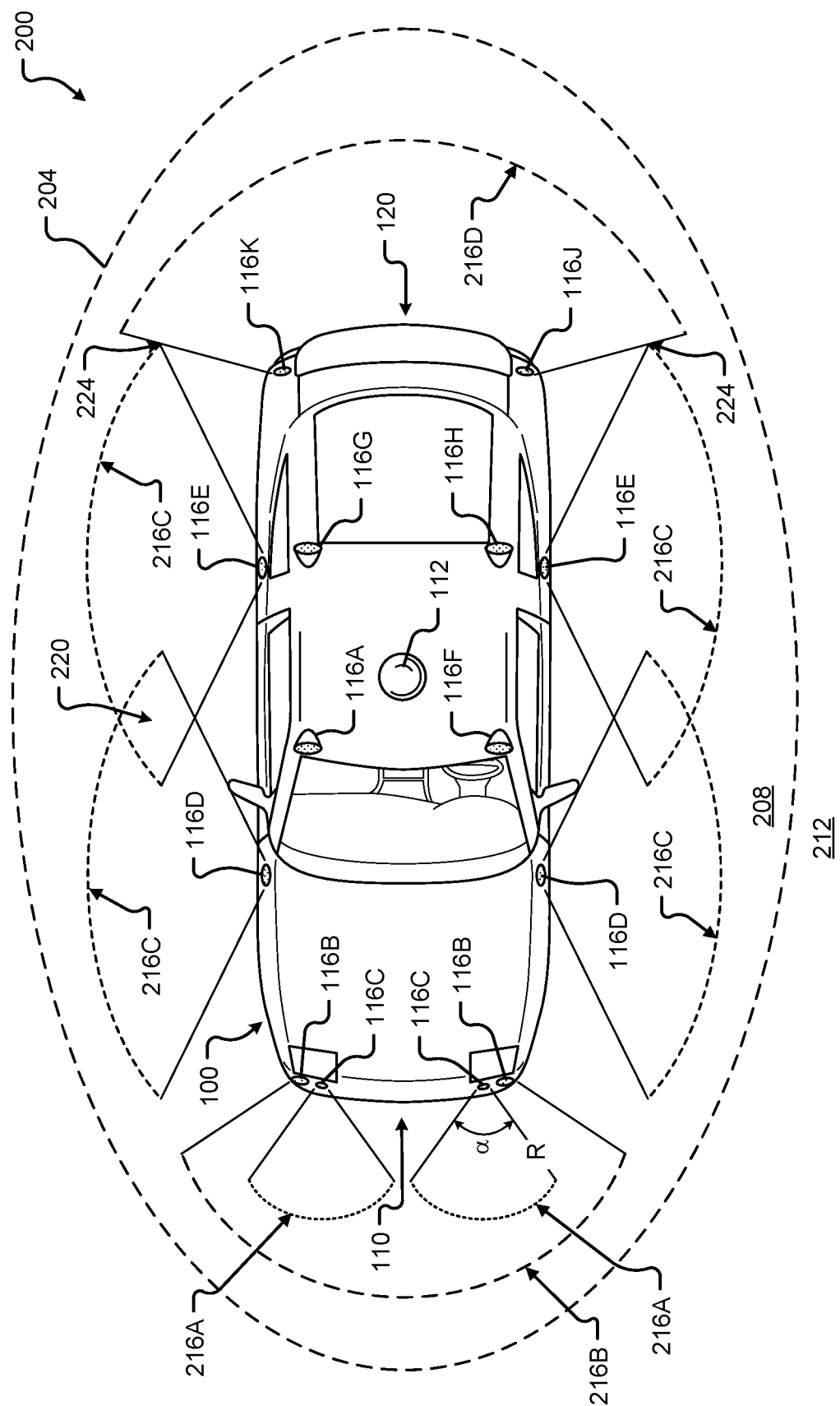
FIG. 2 shows a plan view of the vehicle in accordance with at least some embodiments of the present disclosure.

Referring now to FIG. 2, a plan view of a vehicle 100 will be described in accordance with embodiments of the present disclosure. In particular, FIG. 2 shows a vehicle sensing environment 200 at least partially defined by the sensors and systems 116A-K, 112 disposed in, on, and/or about the vehicle 100. Each sensor 116A-K may include an operational detection range R and operational detection angle α. The operational detection range R may define the effective detection limit, or distance, of the sensor 116A-K. In some cases, this effective detection limit may be defined as a distance from a portion of the sensor 116A-K (e.g., a lens, sensing surface, etc.) to a point in space offset from the sensor 116A-K. The effective detection limit may define a distance, beyond which, the sensing capabilities of the sensor 116A-K deteriorate, fail to work, or are unreliable. In some embodiments, the effective detection limit may define a distance, within which, the sensing capabilities of the sensor 116A-K are able to provide accurate and/or reliable detection information. The operational detection angle α may define at least one angle of a span, or between horizontal and/or vertical limits, of a sensor 116A-K. As can be appreciated, the operational detection limit and the operational detection angle α of a sensor 116A-K together may define the effective detection zone 216A-D (e.g., the effective detection area, and/or volume, etc.) of a sensor 116A-K.

In some embodiments, the vehicle 100 may include a ranging and imaging system 112 such as LIDAR, or the like. The ranging and imaging system 112 may be configured to detect visual information in an environment surrounding the vehicle 100. The visual information detected in the environment surrounding the ranging and imaging system 112 may be processed (e.g., via one or more sensor and/or system processors, etc.) to generate a complete 360-degree view of an environment 200 around the vehicle. The ranging and imaging system 112 may be configured to generate changing 360-degree views of the environment 200 in real-time, for instance, as the vehicle 100 drives. In some cases, the ranging and imaging system 112 may have an effective detection limit 204 that is some distance from the center of the vehicle 100 outward over 360 degrees. The effective detection limit 204 of the ranging and imaging system 112 defines a view zone 208 (e.g., an area and/or volume, etc.) surrounding the vehicle 100. Any object falling outside of the view zone 208 is in the undetected zone 212 and would not be detected by the ranging and imaging system 112 of the vehicle 100.

Sensor data and information may be collected by one or more sensors or systems 116A-K, 112 of the vehicle 100 monitoring the vehicle sensing environment 200. This information may be processed (e.g., via a processor, computer-vision system, etc.) to determine targets (e.g., objects, signs, people, markings, roadways, conditions, etc.) inside one or more detection zones 208, 216A-D associated with the vehicle sensing environment 200. In some cases, information from multiple sensors 116A-K may be processed to form composite sensor detection information. For example, a first sensor 116A and a second sensor 116F may correspond to a first camera 116A and a second camera 116F aimed in a forward traveling direction of the vehicle 100. In this example, images collected by the cameras 116A, 116F may be combined to form stereo image information. This composite information may increase the capabilities of a single sensor in the one or more sensors 116A-K by, for example, adding the ability to determine depth associated with targets in the one or more detection zones 208, 216A-D. Similar image data may be collected by rear view cameras (e.g., sensors 116G, 116H) aimed in a rearward traveling direction vehicle 100.

In some embodiments, multiple sensors 116A-K may be effectively joined to increase a sensing zone and provide increased sensing coverage. For instance, multiple RADAR sensors 116B disposed on the front 110 of the vehicle may be joined to provide a zone 216B of coverage that spans across an entirety of the front 110 of the vehicle. In some cases, the multiple RADAR sensors 116B may cover a detection zone 216B that includes one or more other sensor detection zones 216A. These overlapping detection zones may provide redundant sensing, enhanced sensing, and/or provide greater detail in sensing within a particular portion (e.g., zone 216A) of a larger zone (e.g., zone 216B). Additionally or alternatively, the sensors 116A-K of the vehicle 100 may be arranged to create a complete coverage, via one or more sensing zones 208, 216A-D around the vehicle 100. In some areas, the sensing zones 216C of two or more sensors 116D, 116E may intersect at an overlap zone 220. In some areas, the angle and/or detection limit of two or more sensing zones 216C, 216D (e.g., of two or more sensors 116E, 116J, 116K) may meet at a virtual intersection point 224.

The vehicle 100 may include a number of sensors 116E, 116G, 116H, 116J, 116K disposed proximal to the rear 120 of the vehicle 100. These sensors can include, but are in no way limited to, an imaging sensor, camera, IR, a radio object-detection and ranging sensors, RADAR, RF, ultrasonic sensors, and/or other object-detection sensors. Among other things, these sensors 116E, 116G, 116H, 116J, 116K may detect targets near or approaching the rear of the vehicle 100. For example, another vehicle approaching the rear 120 of the vehicle 100 may be detected by one or more of the ranging and imaging system (e.g., LIDAR) 112, rear-view cameras 116G, 116H, and/or rear facing RADAR sensors 116J, 116K. As described above, the images from the rear-view cameras 116G, 116H may be processed to generate a stereo view (e.g., providing depth associated with an object or environment, etc.) for targets visible to both cameras 116G, 116H. As another example, the vehicle 100 may be driving and one or more of the ranging and imaging system 112, front-facing cameras 116A, 116F, front-facing RADAR sensors 116B, and/or ultrasonic sensors 116C may detect targets in front of the vehicle 100. This approach may provide critical sensor information to a vehicle control system in at least one of the autonomous driving levels described above. For instance, when the vehicle 100 is driving autonomously (e.g., Level 3, Level 4, or Level 5) and detects other vehicles stopped in a travel path, the sensor detection information may be sent to the vehicle control system of the vehicle 100 to control a driving operation (e.g., braking, decelerating, etc.) associated with the vehicle 100 (in this example, slowing the vehicle 100 as to avoid colliding with the stopped other vehicles). As yet another example, the vehicle 100 may be operating and one or more of the ranging and imaging system 112, and/or the side-facing sensors 116D, 116E (e.g., RADAR, ultrasonic, camera, combinations thereof, and/or other type of sensor), may detect targets at a side of the vehicle 100. It should be appreciated that the sensors 116A-K may detect a target that is both at a side 160 and a front 110 of the vehicle 100 (e.g., disposed at a diagonal angle to a centerline of the vehicle 100 running from the front 110 of the vehicle 100 to the rear 120 of the vehicle). Additionally or alternatively, the sensors 116A-K may detect a target that is both, or simultaneously, at a side 160 and a rear 120 of the vehicle 100 (e.g., disposed at a diagonal angle to the centerline of the vehicle 100).

Figure 3:
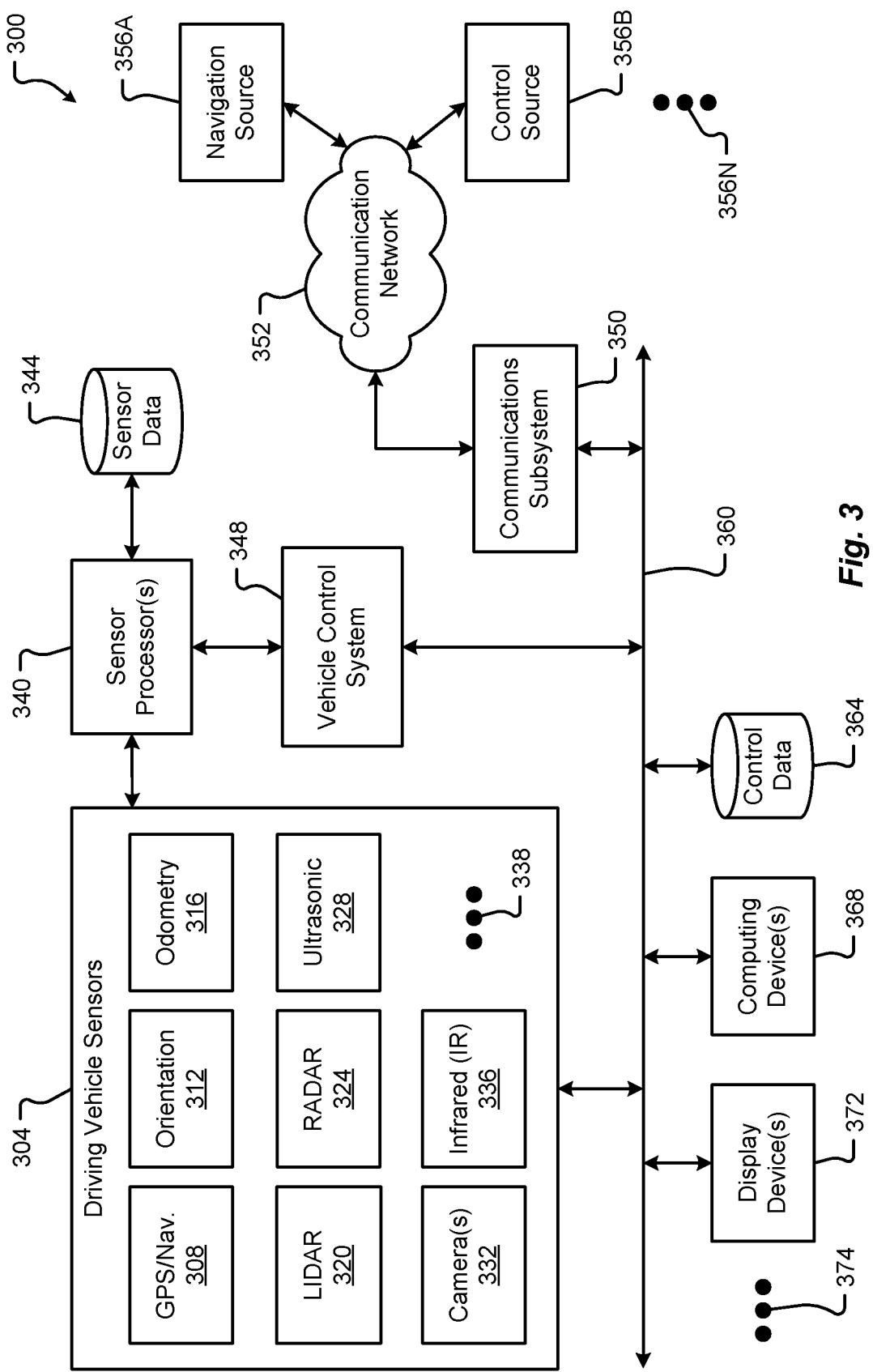
FIG. 3 is a block diagram of an embodiment of a communication environment of the vehicle in accordance with embodiments of the present disclosure.

FIG. 3 is a block diagram of an embodiment of a communication environment 300 of the vehicle 100 in accordance with embodiments of the present disclosure. The communication system 300 may include one or more vehicle driving vehicle sensors and systems 304, sensor processors 340, sensor data memory 344, vehicle control system 348, communications subsystem 350, control data 364, computing devices 368, display devices 372, and other components 374 that may be associated with a vehicle 100. These associated components may be electrically and/or communicatively coupled to one another via at least one bus 360. In some embodiments, the one or more associated components may send and/or receive signals across a communication network 352 to at least one of a navigation source 356A, a control source 356B, or some other entity 356N.

In accordance with at least some embodiments of the present disclosure, the communication network 352 may comprise any type of known communication medium or collection of communication media and may use any type of protocols, such as SIP, TCP/IP, SNA, IPX, AppleTalk, and the like, to transport messages between endpoints. The communication network 352 may include wired and/or wireless communication technologies. The Internet is an example of the communication network 352 that constitutes an Internet Protocol (IP) network consisting of many computers, computing networks, and other communication devices located all over the world, which are connected through many telephone systems and other means. Other examples of the communication network 104 include, without limitation, a standard Plain Old Telephone System (POTS), an Integrated Services Digital Network (ISDN), the Public Switched Telephone Network (PSTN), a Local Area Network (LAN), such as an Ethernet network, a Token-Ring network and/or the like, a Wide Area Network (WAN), a virtual network, including without limitation a virtual private network ("VPN"); the Internet, an intranet, an extranet, a cellular network, an infra-red network; a wireless network (e.g., a network operating under any of the IEEE 802.9 suite of protocols, the Bluetooth® protocol known in the art, and/or any other wireless protocol), and any other type of packet-switched or circuit-switched network known in the art and/or any combination of these and/or other networks. In addition, it can be appreciated that the communication network 352 need not be limited to any one network type, and instead may be comprised of a number of different networks and/or network types. The communication network 352 may comprise a number of different communication media such as coaxial cable, copper cable/wire, fiber-optic cable, antennas for transmitting/receiving wireless messages, and combinations thereof.

The driving vehicle sensors and systems 304 may include at least one navigation 308 (e.g., global positioning system (GPS), etc.), orientation 312, odometry 316, LIDAR 320, RADAR 324, ultrasonic 328, camera 332, infrared (IR) 336, and/or other sensor or system 338. These driving vehicle sensors and systems 304 may be similar, if not identical, to the sensors and systems 116A-K, 112 described in conjunction with FIGS. 1 and 2.

The navigation sensor 308 may include one or more sensors having receivers and antennas that are configured to utilize a satellite-based navigation system including a network of navigation satellites capable of providing geolocation and time information to at least one component of the vehicle 100. Examples of the navigation sensor 308 as described herein may include, but are not limited to, at least one of Garmin® GLO™ family of GPS and GLONASS combination sensors, Garmin® GPS 15×™ family of sensors, Garmin® GPS 16×™ family of sensors with high-sensitivity receiver and antenna, Garmin® GPS 18× OEM family of high-sensitivity GPS sensors, Dewetron DEWE-VGPS series of GPS sensors, GlobalSat 1-Hz series of GPS sensors, other industry-equivalent navigation sensors and/or systems, and may perform navigational and/or geolocation functions using any known or future-developed standard and/or architecture.

The orientation sensor 312 may include one or more sensors configured to determine an orientation of the vehicle 100 relative to at least one reference point. In some embodiments, the orientation sensor 312 may include at least one pressure transducer, stress/strain gauge, accelerometer, gyroscope, and/or geomagnetic sensor. Examples of the navigation sensor 308 as described herein may include, but are not limited to, at least one of Bosch Sensortec BMX 160 series low-power absolute orientation sensors, Bosch Sensortec BMX055 9-axis sensors, Bosch Sensortec BMI055 6-axis inertial sensors, Bosch Sensortec BMI160 6-axis inertial sensors, Bosch Sensortec BMF055 9-axis inertial sensors (accelerometer, gyroscope, and magnetometer) with integrated Cortex M0+ microcontroller, Bosch Sensortec BMP280 absolute barometric pressure sensors, Infineon TLV493D-A1B6 3D magnetic sensors, Infineon TLI493D-W1B6 3D magnetic sensors, Infineon TL family of 3D magnetic sensors, Murata Electronics SCC2000 series combined gyro sensor and accelerometer, Murata Electronics SCC1300 series combined gyro sensor and accelerometer, other industry-equivalent orientation sensors and/or systems, and may perform orientation detection and/or determination functions using any known or future-developed standard and/or architecture.

The odometry sensor and/or system 316 may include one or more components that is configured to determine a change in position of the vehicle 100 over time. In some embodiments, the odometry system 316 may utilize data from one or more other sensors and/or systems 304 in determining a position (e.g., distance, location, etc.) of the vehicle 100 relative to a previously measured position for the vehicle 100. Additionally or alternatively, the odometry sensors 316 may include one or more encoders, Hall speed sensors, and/or other measurement sensors/devices configured to measure a wheel speed, rotation, and/or number of revolutions made over time. Examples of the odometry sensor/system 316 as described herein may include, but are not limited to, at least one of Infineon TLE4924/26/27/28C high-performance speed sensors, Infineon TL4941plusC(B) single chip differential Hall wheel-speed sensors, Infineon TL5041plusC Giant Mangnetoresistance (GMR) effect sensors, Infineon TL family of magnetic sensors, EPC Model 25SP Accu-CoderPro™ incremental shaft encoders, EPC Model 30M compact incremental encoders with advanced magnetic sensing and signal processing technology, EPC Model 925 absolute shaft encoders, EPC Model 958 absolute shaft encoders, EPC Model MA36S/MA63S/SA36S absolute shaft encoders, Dynapar™ F18 commutating optical encoder, Dynapar™ HS35R family of phased array encoder sensors, other industry-equivalent odometry sensors and/or systems, and may perform change in position detection and/or determination functions using any known or future-developed standard and/or architecture.

The LIDAR sensor/system 320 may include one or more components configured to measure distances to targets using laser illumination. In some embodiments, the LIDAR sensor/system 320 may provide 3D imaging data of an environment around the vehicle 100. The imaging data may be processed to generate a full 360-degree view of the environment around the vehicle 100. The LIDAR sensor/system 320 may include a laser light generator configured to generate a plurality of target illumination laser beams (e.g., laser light channels). In some embodiments, this plurality of laser beams may be aimed at, or directed to, a rotating reflective surface (e.g., a mirror) and guided outwardly from the LIDAR sensor/system 320 into a measurement environment. The rotating reflective surface may be configured to continually rotate 360 degrees about an axis, such that the plurality of laser beams is directed in a full 360-degree range around the vehicle 100. A photodiode receiver of the LIDAR sensor/system 320 may detect when light from the plurality of laser beams emitted into the measurement environment returns (e.g., reflected echo) to the LIDAR sensor/system 320. The LIDAR sensor/system 320 may calculate, based on a time associated with the emission of light to the detected return of light, a distance from the vehicle 100 to the illuminated target. In some embodiments, the LIDAR sensor/system 320 may generate over 2.0 million points per second and have an effective operational range of at least 100 meters. Examples of the LIDAR sensor/system 320 as described herein may include, but are not limited to, at least one of Velodyne® LiDAR™ HDL-64E 64-channel LIDAR sensors, Velodyne® LiDAR™ HDL-32E 32-channel LIDAR sensors, Velodyne® LiDAR™ PUCK™ VLP-16 16-channel LIDAR sensors, Leica Geosystems Pegasus: Two mobile sensor platform, Garmin® LIDAR-Lite v3 measurement sensor, Quanergy M8 LiDAR sensors, Quanergy S3 solid state LiDAR sensor, LeddarTech® LeddarVU compact solid state fixed-beam LIDAR sensors, other industry-equivalent LIDAR sensors and/or systems, and may perform illuminated target and/or obstacle detection in an environment around the vehicle 100 using any known or future-developed standard and/or architecture.

The RADAR sensors 324 may include one or more radio components that are configured to detect objects/targets in an environment of the vehicle 100. In some embodiments, the RADAR sensors 324 may determine a distance, position, and/or movement vector (e.g., angle, speed, etc.) associated with a target over time. The RADAR sensors 324 may include a transmitter configured to generate and emit electromagnetic waves (e.g., radio, microwaves, etc.) and a receiver configured to detect returned electromagnetic waves. In some embodiments, the RADAR sensors 324 may include at least one processor configured to interpret the returned electromagnetic waves and determine locational properties of targets. Examples of the RADAR sensors 324 as described herein may include, but are not limited to, at least one of Infineon RASIC™ RTN7735PL transmitter and RRN7745PL/46PL receiver sensors, Autoliv ASP Vehicle RADAR sensors, Delphi L2C0051TR 77 GHz ESR Electronically Scanning Radar sensors, Fujitsu Ten Ltd. Automotive Compact 77 GHz 3D Electronic Scan Millimeter Wave Radar sensors, other industry-equivalent RADAR sensors and/or systems, and may perform radio target and/or obstacle detection in an environment around the vehicle 100 using any known or future-developed standard and/or architecture.

The ultrasonic sensors 328 may include one or more components that are configured to detect objects/targets in an environment of the vehicle 100. In some embodiments, the ultrasonic sensors 328 may determine a distance, position, and/or movement vector (e.g., angle, speed, etc.) associated with a target over time. The ultrasonic sensors 328 may include an ultrasonic transmitter and receiver, or transceiver, configured to generate and emit ultrasound waves and interpret returned echoes of those waves. In some embodiments, the ultrasonic sensors 328 may include at least one processor configured to interpret the returned ultrasonic waves and determine locational properties of targets. Examples of the ultrasonic sensors 328 as described herein may include, but are not limited to, at least one of Texas Instruments TIDA-00151 automotive ultrasonic sensor interface IC sensors, MaxBotix® MB8450 ultrasonic proximity sensor, MaxBotix® ParkSonar™-EZ ultrasonic proximity sensors, Murata Electronics MA40H1S-R open-structure ultrasonic sensors, Murata Electronics MA40S4R/S open-structure ultrasonic sensors, Murata Electronics MA58MF14-7N waterproof ultrasonic sensors, other industry-equivalent ultrasonic sensors and/or systems, and may perform ultrasonic target and/or obstacle detection in an environment around the vehicle 100 using any known or future-developed standard and/or architecture.

The camera sensors 332 may include one or more components configured to detect image information associated with an environment of the vehicle 100. In some embodiments, the camera sensors 332 may include a lens, filter, image sensor, and/or a digital image processer. It is an aspect of the present disclosure that multiple camera sensors 332 may be used together to generate stereo images providing depth measurements. Examples of the camera sensors 332 as described herein may include, but are not limited to, at least one of ON Semiconductor® MT9V024 Global Shutter VGA GS CMOS image sensors, Teledyne DALSA Falcon2 camera sensors, CMOSIS CMV50000 high-speed CMOS image sensors, other industry-equivalent camera sensors and/or systems, and may perform visual target and/or obstacle detection in an environment around the vehicle 100 using any known or future-developed standard and/or architecture.

The infrared (IR) sensors 336 may include one or more components configured to detect image information associated with an environment of the vehicle 100. The IR sensors 336 may be configured to detect targets in low-light, dark, or poorly-lit environments. The IR sensors 336 may include an IR light emitting element (e.g., IR light emitting diode (LED), etc.) and an IR photodiode. In some embodiments, the IR photodiode may be configured to detect returned IR light at or about the same wavelength to that emitted by the IR light emitting element. In some embodiments, the IR sensors 336 may include at least one processor configured to interpret the returned IR light and determine locational properties of targets. The IR sensors 336 may be configured to detect and/or measure a temperature associated with a target (e.g., an object, pedestrian, other vehicle, etc.). Examples of IR sensors 336 as described herein may include, but are not limited to, at least one of Opto Diode lead-salt IR array sensors, Opto Diode OD-850 Near-IR LED sensors, Opto Diode SA/SHA727 steady state IR emitters and IR detectors, FLIR® LS microbolometer sensors, FLIR® TacFLIR 380-HD InSb MWIR FPA and HD MWIR thermal sensors, FLIR® VOx 640×480 pixel detector sensors, Delphi IR sensors, other industry-equivalent IR sensors and/or systems, and may perform IR visual target and/or obstacle detection in an environment around the vehicle 100 using any known or future-developed standard and/or architecture.

In some embodiments, the driving vehicle sensors and systems 304 may include other sensors 338 and/or combinations of the sensors 308-336 described above. Additionally or alternatively, one or more of the sensors 308-336 described above may include one or more processors configured to process and/or interpret signals detected by the one or more sensors 308-336. In some embodiments, the processing of at least some sensor information provided by the vehicle sensors and systems 304 may be processed by at least one sensor processor 340. Raw and/or processed sensor data may be stored in a sensor data memory 344 storage medium. In some embodiments, the sensor data memory 344 may store instructions used by the sensor processor 340 for processing sensor information provided by the sensors and systems 304. In any event, the sensor data memory 344 may be a disk drive, optical storage device, solid-state storage device such as a random access memory ("RAM") and/or a read-only memory ("ROM"), which can be programmable, flash-updateable, and/or the like.

The vehicle control system 348 may receive processed sensor information from the sensor processor 340 and determine to control an aspect of the vehicle 100. Controlling an aspect of the vehicle 100 may include presenting information via one or more display devices 372 associated with the vehicle, sending commands to one or more computing devices 368 associated with the vehicle, and/or controlling a driving operation of the vehicle. In some embodiments, the vehicle control system 348 may correspond to one or more computing systems that control driving operations of the vehicle 100 in accordance with the Levels of driving autonomy described above. In one embodiment, the vehicle control system 348 may operate a speed of the vehicle 100 by controlling an output signal to the accelerator and/or braking system of the vehicle. In this example, the vehicle control system 348 may receive sensor data describing an environment surrounding the vehicle 100 and, based on the sensor data received, determine to adjust the acceleration, power output, and/or braking of the vehicle 100. The vehicle control system 348 may additionally control steering and/or other driving functions of the vehicle 100.

The vehicle control system 348 may communicate, in real-time, with the driving sensors and systems 304 forming a feedback loop. In particular, upon receiving sensor information describing a condition of targets in the environment surrounding the vehicle 100, the vehicle control system 348 may autonomously make changes to a driving operation of the vehicle 100. The vehicle control system 348 may then receive subsequent sensor information describing any change to the condition of the targets detected in the environment as a result of the changes made to the driving operation. This continual cycle of observation (e.g., via the sensors, etc.) and action (e.g., selected control or non-control of vehicle operations, etc.) allows the vehicle 100 to operate autonomously in the environment.

In some embodiments, the one or more components of the vehicle 100 (e.g., the driving vehicle sensors 304, vehicle control system 348, display devices 372, etc.) may communicate across the communication network 352 to one or more entities 356A-N via a communications subsystem 350 of the vehicle 100. Embodiments of the communications subsystem 350 are described in greater detail in conjunction with FIG. 5. For instance, the navigation sensors 308 may receive global positioning, location, and/or navigational information from a navigation source 356A. In some embodiments, the navigation source 356A may be a global navigation satellite system (GNSS) similar, if not identical, to NAVSTAR GPS, GLONASS, EU Galileo, and/or the BeiDou Navigation Satellite System (BDS) to name a few.

In some embodiments, the vehicle control system 348 may receive control information from one or more control sources 356B. The control source 356 may provide vehicle control information including autonomous driving control commands, vehicle operation override control commands, and the like. The control source 356 may correspond to an autonomous vehicle control system, a traffic control system, an administrative control entity, and/or some other controlling server. It is an aspect of the present disclosure that the vehicle control system 348 and/or other components of the vehicle 100 may exchange communications with the control source 356 across the communication network 352 and via the communications subsystem 350.

Information associated with controlling driving operations of the vehicle 100 may be stored in a control data memory 364 storage medium. The control data memory 364 may store instructions used by the vehicle control system 348 for controlling driving operations of the vehicle 100, historical control information, autonomous driving control rules, and the like. In some embodiments, the control data memory 364 may be a disk drive, optical storage device, solid-state storage device such as a random access memory ("RAM") and/or a read-only memory ("ROM"), which can be programmable, flash-updateable, and/or the like.

In addition to the mechanical components described herein, the vehicle 100 may include a number of user interface devices. The user interface devices receive and translate human input into a mechanical movement or electrical signal or stimulus. The human input may be one or more of motion (e.g., body movement, body part movement, in two-dimensional or three-dimensional space, etc.), voice, touch, and/or physical interaction with the components of the vehicle 100. In some embodiments, the human input may be configured to control one or more functions of the vehicle 100 and/or systems of the vehicle 100 described herein. User interfaces may include, but are in no way limited to, at least one graphical user interface of a display device, steering wheel or mechanism, transmission lever or button (e.g., including park, neutral, reverse, and/or drive positions, etc.), throttle control pedal or mechanism, brake control pedal or mechanism, power control switch, communications equipment, etc.

Figure 4:
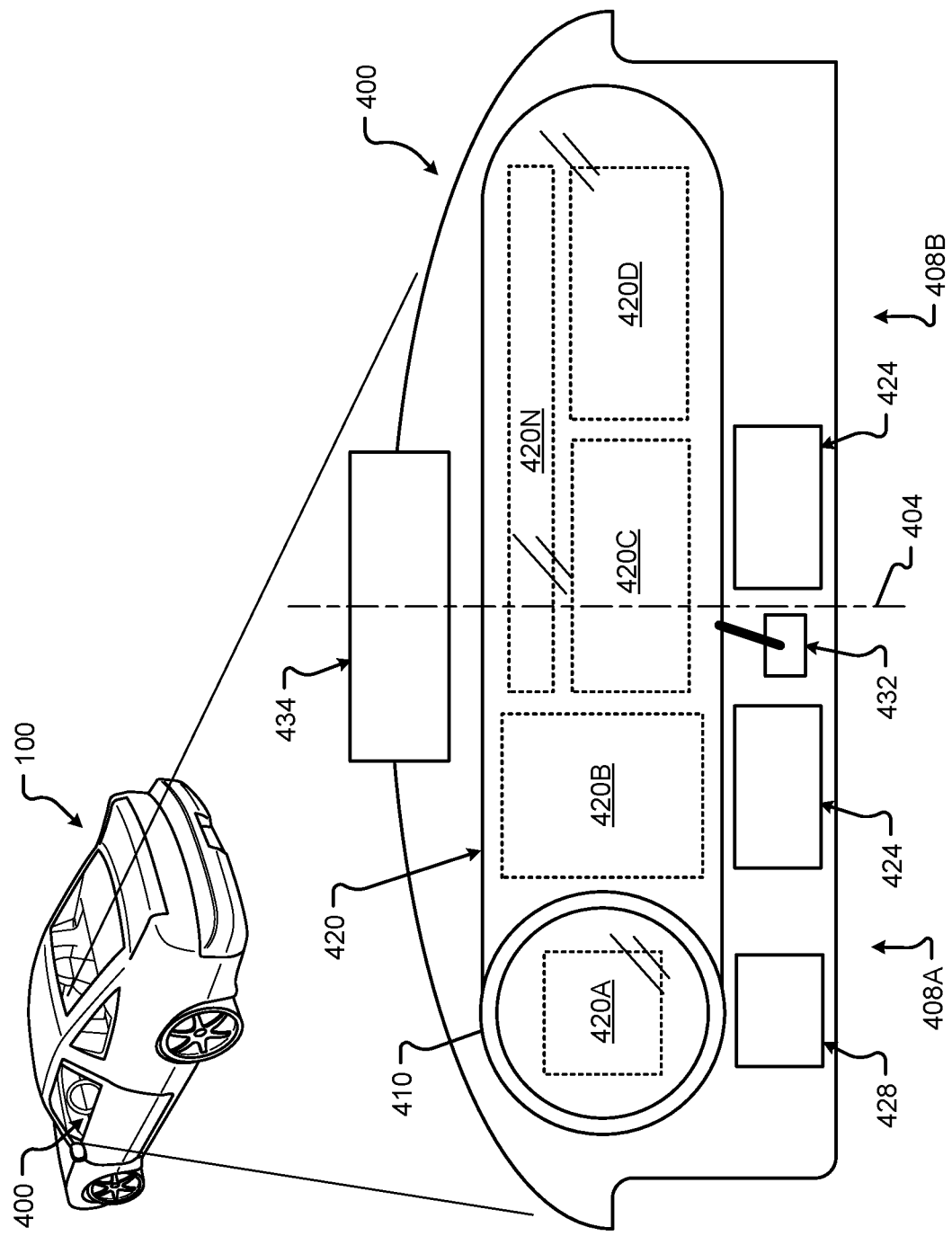
FIG. 4 shows an embodiment of the instrument panel of the vehicle according to one embodiment of the present disclosure.

FIG. 4 shows one embodiment of the instrument panel 400 of the vehicle 100. The instrument panel 400 of vehicle 100 comprises a steering wheel 410, a vehicle operational display 420 (e.g., configured to present and/or display driving data such as speed, measured air resistance, vehicle information, entertainment information, etc.), one or more auxiliary displays 424 (e.g., configured to present and/or display information segregated from the operational display 420, entertainment applications, movies, music, etc.), a heads-up display 434 (e.g., configured to display any information previously described including, but in no way limited to, guidance information such as route to destination, or obstacle warning information to warn of a potential collision, or some or all primary vehicle operational data such as speed, resistance, etc.), a power management display 428 (e.g., configured to display data corresponding to electric power levels of vehicle 100, reserve power, charging status, etc.), and an input device 432 (e.g., a controller, touchscreen, or other interface device configured to interface with one or more displays in the instrument panel or components of the vehicle 100. The input device 432 may be configured as a joystick, mouse, touchpad, tablet, 3D gesture capture device, etc.). In some embodiments, the input device 432 may be used to manually maneuver a portion of the vehicle 100 into a charging position (e.g., moving a charging plate to a desired separation distance, etc.).

While one or more of displays of instrument panel 400 may be touch-screen displays, it should be appreciated that the vehicle operational display may be a display incapable of receiving touch input. For instance, the operational display 420 that spans across an interior space centerline 404 and across both a first zone 408A and a second zone 408B may be isolated from receiving input from touch, especially from a passenger. In some cases, a display that provides vehicle operation or critical systems information and interface may be restricted from receiving touch input and/or be configured as a non-touch display. This type of configuration can prevent dangerous mistakes in providing touch input where such input may cause an accident or unwanted control.

In some embodiments, one or more displays of the instrument panel 400 may be mobile devices and/or applications residing on a mobile device such as a smart phone. Additionally or alternatively, any of the information described herein may be presented to one or more portions 420A-N of the operational display 420 or other display 424, 428, 434. In one embodiment, one or more displays of the instrument panel 400 may be physically separated or detached from the instrument panel 400. In some cases, a detachable display may remain tethered to the instrument panel.

The portions 420A-N of the operational display 420 may be dynamically reconfigured and/or resized to suit any display of information as described. Additionally or alternatively, the number of portions 420A-N used to visually present information via the operational display 420 may be dynamically increased or decreased as required, and are not limited to the configurations shown.

Figure 5:
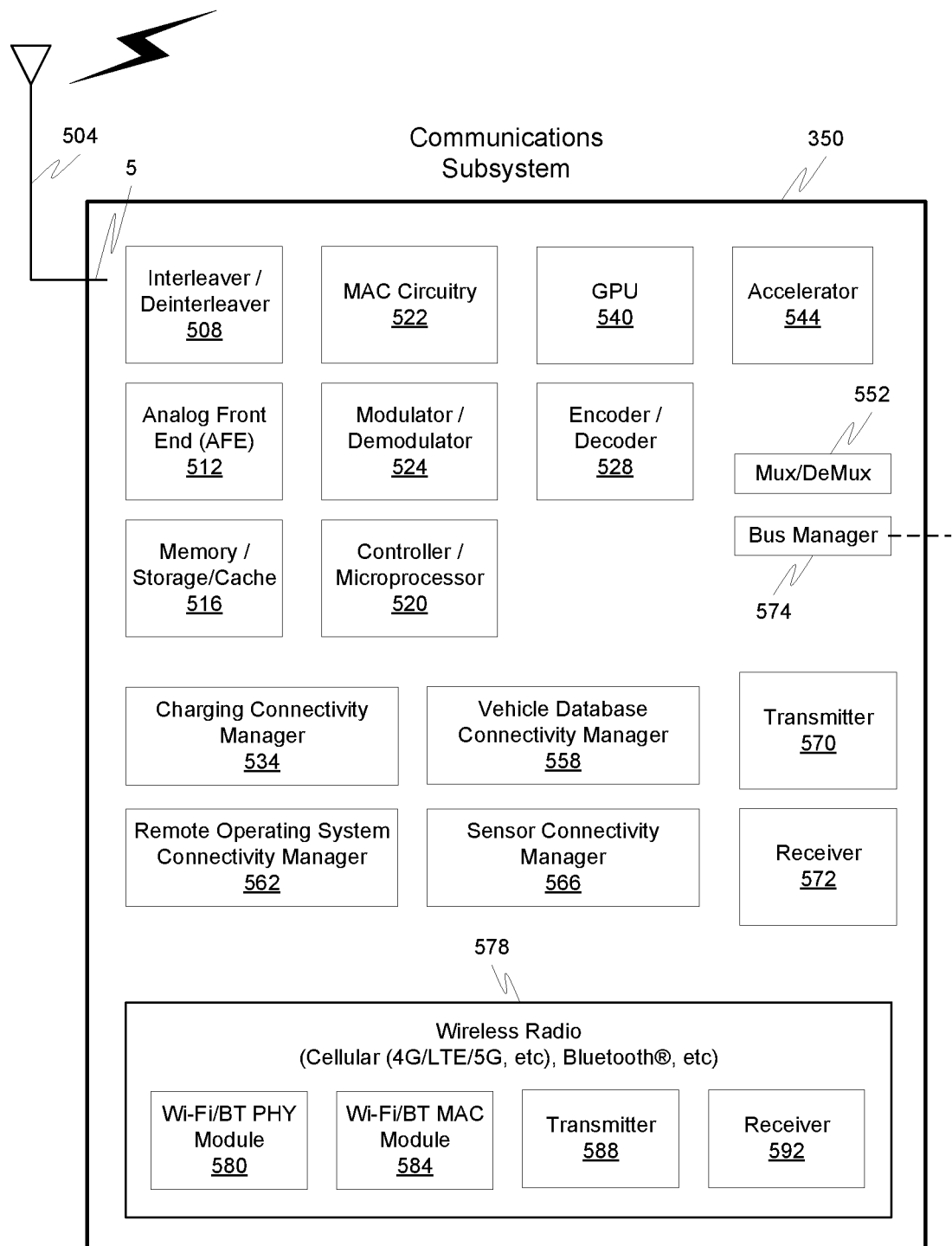
FIG. 5 is a block diagram of an embodiment of a communications subsystem of the vehicle.

FIG. 5 illustrates a hardware diagram of communications componentry that can be optionally associated with the vehicle 100 in accordance with embodiments of the present disclosure.

The communications componentry can include one or more wired or wireless devices such as a transceiver(s) and/or modem that allows communications not only between the various systems disclosed herein but also with other devices, such as devices on a network, and/or on a distributed network such as the Internet and/or in the cloud and/or with other vehicle(s).

The communications subsystem 350 can also include inter- and intra-vehicle communications capabilities such as hotspot and/or access point connectivity for any one or more of the vehicle occupants and/or vehicle-to-vehicle communications.

Additionally, and while not specifically illustrated, the communications subsystem 350 can include one or more communications links (that can be wired or wireless) and/or communications busses (managed by the bus manager 574), including one or more of CANbus, OBD-II, ARCINC 429, Byteflight, CAN (Controller Area Network), D2B (Domestic Digital Bus), FlexRay, DC-BUS, IDB-1394, IEBus, I2C, ISO 9141-1/-2, J1708, J1587, J1850, J1939, ISO 11783, Keyword Protocol 2000, LIN (Local Interconnect Network), MOST (Media Oriented Systems Transport), Multifunction Vehicle Bus, SMARTwireX, SPI, VAN (Vehicle Area Network), and the like or in general any communications protocol and/or standard(s).

The various protocols and communications can be communicated one or more of wirelessly and/or over transmission media such as single wire, twisted pair, fiber optic, IEEE 1394, MIL-STD-1553, MIL-STD-1773, power-line communication, or the like. (All of the above standards and protocols are incorporated herein by reference in their entirety).

As discussed, the communications subsystem 350 enables communications between any if the inter-vehicle systems and subsystems as well as communications with non-collocated resources, such as those reachable over a network such as the Internet.

The communications subsystem 350, in addition to well-known componentry (which has been omitted for clarity), includes interconnected elements including one or more of: one or more antennas 504, an interleaver/deinterleaver 508, an analog front end (AFE) 512, memory/storage/cache 516, controller/microprocessor 520, MAC circuitry 522, modulator/demodulator 524, encoder/decoder 528, a plurality of connectivity managers 534, 558, 562, 566, GPU 540, accelerator 544, a multiplexer/demultiplexer 552, transmitter 570, receiver 572 and wireless radio 578 components such as a Wi-Fi PHY/Bluetooth® module 580, a Wi-Fi/BT MAC module 584, transmitter 588 and receiver 592. The various elements in the device 350 are connected by one or more links/busses 5 (not shown, again for sake of clarity).

The device 350 can have one more antennas 504, for use in wireless communications such as multi-input multi-output (MIMO) communications, multi-user multi-input multi-output (MU-MIMO) communications Bluetooth®, LTE, 4G, 5G, Near-Field Communication (NFC), etc., and in general for any type of wireless communications. The antenna(s) 504 can include, but are not limited to one or more of directional antennas, omnidirectional antennas, monopoles, patch antennas, loop antennas, microstrip antennas, dipoles, and any other antenna(s) suitable for communication transmission/reception. In an exemplary embodiment, transmission/reception using MIMO may require particular antenna spacing. In another exemplary embodiment, MIMO transmission/reception can enable spatial diversity allowing for different channel characteristics at each of the antennas. In yet another embodiment, MIMO transmission/reception can be used to distribute resources to multiple users for example within the vehicle 100 and/or in another vehicle.

Antenna(s) 504 generally interact with the Analog Front End (AFE) 512, which is needed to enable the correct processing of the received modulated signal and signal conditioning for a transmitted signal. The AFE 512 can be functionally located between the antenna and a digital baseband system in order to convert the analog signal into a digital signal for processing and vice-versa.

The subsystem 350 can also include a controller/microprocessor 520 and a memory/storage/cache 516. The subsystem 350 can interact with the memory/storage/cache 516 which may store information and operations necessary for configuring and transmitting or receiving the information described herein. The memory/storage/cache 516 may also be used in connection with the execution of application programming or instructions by the controller/microprocessor 520, and for temporary or long term storage of program instructions and/or data. As examples, the memory/storage/cache 520 may comprise a computer-readable device, RAM, ROM, DRAM, SDRAM, and/or other storage device(s) and media.

The controller/microprocessor 520 may comprise a general purpose programmable processor or controller for executing application programming or instructions related to the subsystem 350. Furthermore, the controller/microprocessor 520 can perform operations for configuring and transmitting/receiving information as described herein. The controller/microprocessor 520 may include multiple processor cores, and/or implement multiple virtual processors. Optionally, the controller/microprocessor 520 may include multiple physical processors. By way of example, the controller/microprocessor 520 may comprise a specially configured Application Specific Integrated Circuit (ASIC) or other integrated circuit, a digital signal processor(s), a controller, a hardwired electronic or logic circuit, a programmable logic device or gate array, a special purpose computer, or the like.

The subsystem 350 can further include a transmitter 570 and receiver 572 which can transmit and receive signals, respectively, to and from other devices, subsystems and/or other destinations using the one or more antennas 504 and/or links/busses. Included in the subsystem 350 circuitry is the medium access control or MAC Circuitry 522. MAC circuitry 522 provides for controlling access to the wireless medium. In an exemplary embodiment, the MAC circuitry 522 may be arranged to contend for the wireless medium and configure frames or packets for communicating over the wired/wireless medium.

The subsystem 350 can also optionally contain a security module (not shown). This security module can contain information regarding but not limited to, security parameters required to connect the device to one or more other devices or other available network(s), and can include WEP or WPA/WPA-2 (optionally+AES and/or TKIP) security access keys, network keys, etc. The WEP security access key is a security password used by Wi-Fi networks. Knowledge of this code can enable a wireless device to exchange information with an access point and/or another device. The information exchange can occur through encoded messages with the WEP access code often being chosen by the network administrator. WPA is an added security standard that is also used in conjunction with network connectivity with stronger encryption than WEP.

In some embodiments, the communications subsystem 350 also includes a GPU 540, an accelerator 544, a Wi-Fi/BT/BLE PHY module 580 and a Wi-Fi/BT/BLE MAC module 584 and wireless transmitter 588 and receiver 592. In some embodiments, the GPU 540 may be a graphics processing unit, or visual processing unit, comprising at least one circuit and/or chip that manipulates and changes memory to accelerate the creation of images in a frame buffer for output to at least one display device. The GPU 540 may include one or more of a display device connection port, printed circuit board (PCB), a GPU chip, a metal-oxide-semiconductor field-effect transistor (MOSFET), memory (e.g., single data rate random-access memory (SDRAM), double data rate random-access memory (DDR) RAM, etc., and/or combinations thereof), a secondary processing chip (e.g., handling video out capabilities, processing, and/or other functions in addition to the GPU chip, etc.), a capacitor, heatsink, temperature control or cooling fan, motherboard connection, shielding, and the like.

The various connectivity managers 534, 558, 562, 566 manage and/or coordinate communications between the subsystem 350 and one or more of the systems disclosed herein and one or more other devices/systems. The connectivity managers 534, 558, 562, 566 include a charging connectivity manager 534, a vehicle database connectivity manager 558, a remote operating system connectivity manager 562, and a sensor connectivity manager 566.

The charging connectivity manager 534 can coordinate not only the physical connectivity between the vehicle 100 and a charging device/vehicle, but can also communicate with one or more of a power management controller, one or more third parties and optionally a billing system(s). As an example, the vehicle 100 can establish communications with the charging device/vehicle to one or more of coordinate interconnectivity between the two (e.g., by spatially aligning the charging receptacle on the vehicle with the charger on the charging vehicle) and optionally share navigation information. Once charging is complete, the amount of charge provided can be tracked and optionally forwarded to, for example, a third party for billing. In addition to being able to manage connectivity for the exchange of power, the charging connectivity manager 534 can also communicate information, such as billing information to the charging vehicle and/or a third party. This billing information could be, for example, the owner of the vehicle, the driver/occupant(s) of the vehicle, company information, or in general any information usable to charge the appropriate entity for the power received.

The vehicle database connectivity manager 558 allows the subsystem to receive and/or share information stored in the vehicle database. This information can be shared with other vehicle components/subsystems and/or other entities, such as third parties and/or charging systems. The information can also be shared with one or more vehicle occupant devices, such as an app (application) on a mobile device the driver uses to track information about the vehicle 100 and/or a dealer or service/maintenance provider. In general any information stored in the vehicle database can optionally be shared with any one or more other devices optionally subject to any privacy or confidentially restrictions.

The remote operating system connectivity manager 562 facilitates communications between the vehicle 100 and any one or more autonomous vehicle systems. These communications can include one or more of navigation information, vehicle information, other vehicle information, weather information, occupant information, or in general any information related to the remote operation of the vehicle 100.

The sensor connectivity manager 566 facilitates communications between any one or more of the vehicle sensors (e.g., the driving vehicle sensors and systems 304, etc.) and any one or more of the other vehicle systems. The sensor connectivity manager 566 can also facilitate communications between any one or more of the sensors and/or vehicle systems and any other destination, such as a service company, app, or in general to any destination where sensor data is needed.

In accordance with one exemplary embodiment, any of the communications discussed herein can be communicated via the conductor(s) used for charging. One exemplary protocol usable for these communications is Power-line communication (PLC). PLC is a communication protocol that uses electrical wiring to simultaneously carry both data, and Alternating Current (AC) electric power transmission or electric power distribution. It is also known as power-line carrier, power-line digital subscriber line (PDSL), mains communication, power-line telecommunications, or power-line networking (PLN). For DC environments in vehicles PLC can be used in conjunction with CAN-bus, LIN-bus over power line (DC-LIN) and DC-BUS.

The communications subsystem can also optionally manage one or more identifiers, such as an IP (internet protocol) address(es), associated with the vehicle and one or other system or subsystems or components therein. These identifiers can be used in conjunction with any one or more of the connectivity managers as discussed herein.

Figure 6:
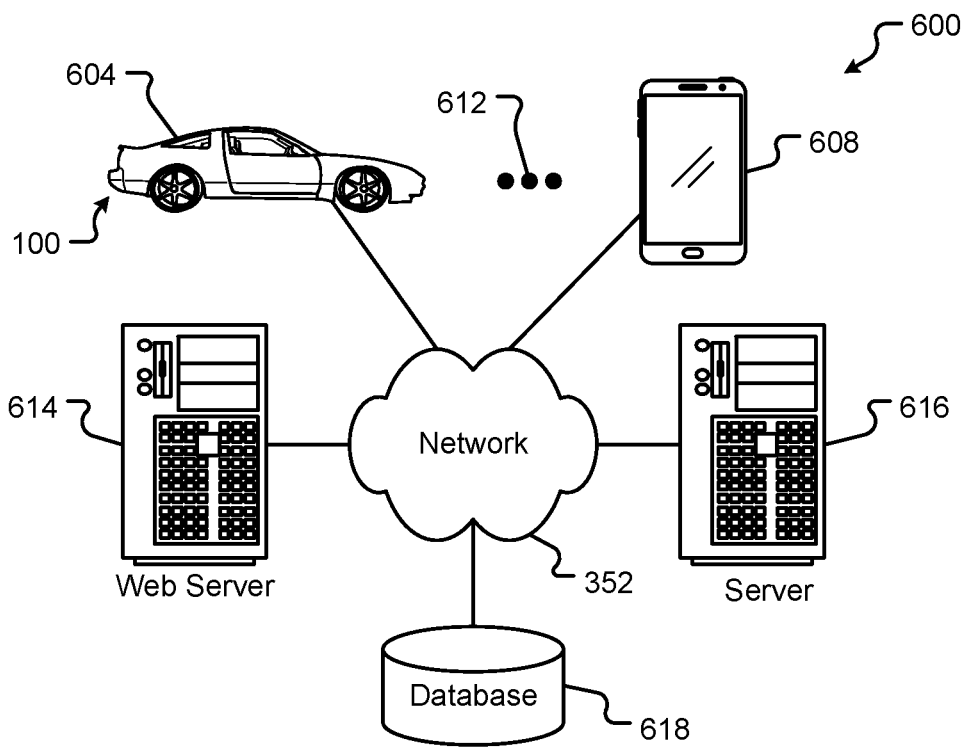
FIG. 6 is a block diagram of a computing environment associated with the embodiments presented herein.

FIG. 6 illustrates a block diagram of a computing environment 600 that may function as the servers, user computers, or other systems provided and described herein. The computing environment 600 includes one or more user computers, or computing devices, such as a vehicle computing device 604, a communication device 608, and/or more 612. The computing devices 604, 608, 612 may include general purpose personal computers (including, merely by way of example, personal computers, and/or laptop computers running various versions of Microsoft Corp.'s Windows® and/or Apple Corp.'s Macintosh® operating systems) and/or workstation computers running any of a variety of commercially-available UNIX® or UNIX-like operating systems. These computing devices 604, 608, 612 may also have any of a variety of applications, including for example, database client and/or server applications, and web browser applications. Alternatively, the computing devices 604, 608, 612 may be any other electronic device, such as a thin-client computer, Internet-enabled mobile telephone, and/or personal digital assistant, capable of communicating via a network 352 and/or displaying and navigating web pages or other types of electronic documents. Although the exemplary computing environment 600 is shown with two computing devices, any number of user computers or computing devices may be supported.

The computing environment 600 may also include one or more servers 614, 616. In this example, server 614 is shown as a web server and server 616 is shown as an application server. The web server 614, which may be used to process requests for web pages or other electronic documents from computing devices 604, 608, 612. The web server 614 can be running an operating system including any of those discussed above, as well as any commercially-available server operating systems. The web server 614 can also run a variety of server applications, including SIP (Session Initiation Protocol) servers, HTTP(s) servers, FTP servers, CGI servers, database servers, Java servers, and the like. In some instances, the web server 614 may publish operations available operations as one or more web services.

The computing environment 600 may also include one or more file and or/application servers 616, which can, in addition to an operating system, include one or more applications accessible by a client running on one or more of the computing devices 604, 608, 612. The server(s) 616 and/or 614 may be one or more general purpose computers capable of executing programs or scripts in response to the computing devices 604, 608, 612. As one example, the server 616, 614 may execute one or more web applications. The web application may be implemented as one or more scripts or programs written in any programming language, such as Java™, C, C#®, or C++, and/or any scripting language, such as Perl, Python, or TCL, as well as combinations of any programming/scripting languages. The application server(s) 616 may also include database servers, including without limitation those commercially available from Oracle®, Microsoft®, Sybase®, IBM® and the like, which can process requests from database clients running on a computing device 604, 608, 612.

The web pages created by the server 614 and/or 616 may be forwarded to a computing device 604, 608, 612 via a web (file) server 614, 616. Similarly, the web server 614 may be able to receive web page requests, web services invocations, and/or input data from a computing device 604, 608, 612 (e.g., a user computer, etc.) and can forward the web page requests and/or input data to the web (application) server 616. In further embodiments, the server 616 may function as a file server. Although for ease of description, FIG. 6 illustrates a separate web server 614 and file/application server 616, those skilled in the art will recognize that the functions described with respect to servers 614, 616 may be performed by a single server and/or a plurality of specialized servers, depending on implementation-specific needs and parameters. The computer systems 604, 608, 612, web (file) server 614 and/or web (application) server 616 may function as the system, devices, or components described in FIGS. 1-6.

The computing environment 600 may also include a database 618. The database 618 may reside in a variety of locations. By way of example, database 618 may reside on a storage medium local to (and/or resident in) one or more of the computers 604, 608, 612, 614, 616. Alternatively, it may be remote from any or all of the computers 604, 608, 612, 614, 616, and in communication (e.g., via the network 610) with one or more of these. The database 618 may reside in a storage-area network ("SAN") familiar to those skilled in the art. Similarly, any necessary files for performing the functions attributed to the computers 604, 608, 612, 614, 616 may be stored locally on the respective computer and/or remotely, as appropriate. The database 618 may be a relational database, such as Oracle 20i®, that is adapted to store, update, and retrieve data in response to SQL-formatted commands.

Figure 7:
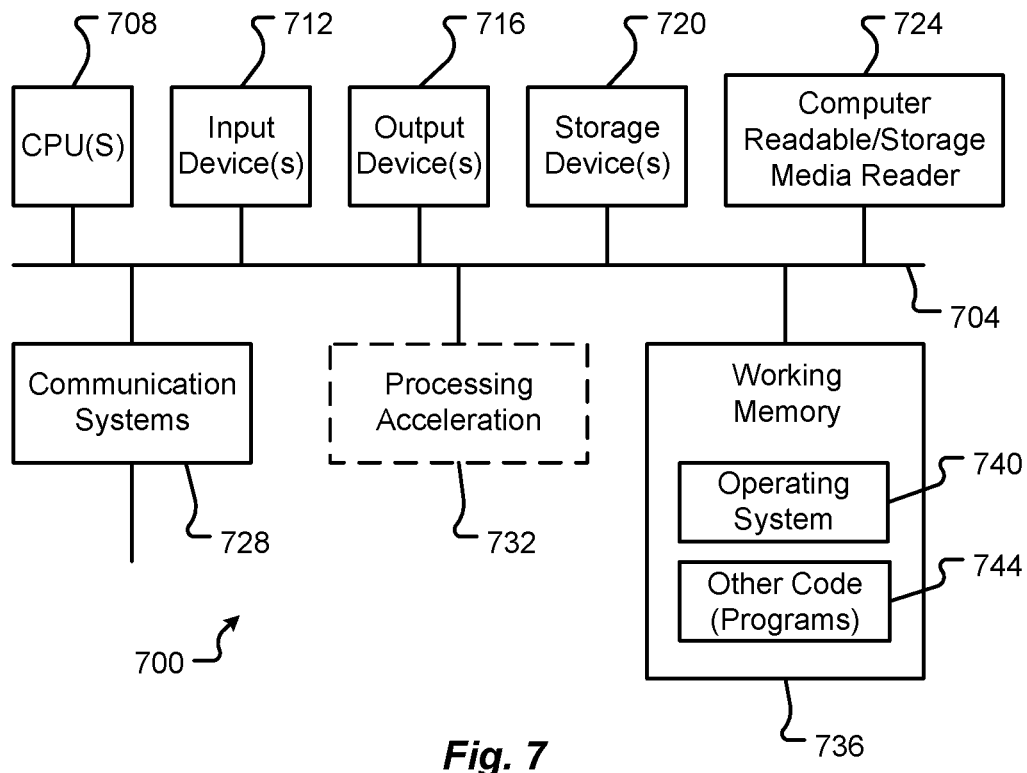
FIG. 7 is a block diagram of a computing device associated with one or more components described herein.

FIG. 7 illustrates one embodiment of a computer system 700 upon which the servers, user computers, computing devices, or other systems or components described above may be deployed or executed. The computer system 700 is shown comprising hardware elements that may be electrically coupled via a bus 704. The hardware elements may include one or more central processing units (CPUs) 708; one or more input devices 712 (e.g., a mouse, a keyboard, etc.); and one or more output devices 716 (e.g., a display device, a printer, etc.). The computer system 700 may also include one or more storage devices 720. By way of example, storage device(s) 720 may be disk drives, optical storage devices, solid-state storage devices such as a random access memory ("RAM") and/or a read-only memory ("ROM"), which can be programmable, flash-updateable and/or the like.

The computer system 700 may additionally include a computer-readable storage media reader 724; a communications system 728 (e.g., a modem, a network card (wireless or wired), an infra-red communication device, etc.); and working memory 736, which may include RAM and ROM devices as described above. The computer system 700 may also include a processing acceleration unit 732, which can include a DSP, a special-purpose processor, and/or the like.

The computer-readable storage media reader 724 can further be connected to a computer-readable storage medium, together (and, optionally, in combination with storage device(s) 720) comprehensively representing remote, local, fixed, and/or removable storage devices plus storage media for temporarily and/or more permanently containing computer-readable information. The communications system 728 may permit data to be exchanged with a network and/or any other computer described above with respect to the computer environments described herein. Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information.

The computer system 700 may also comprise software elements, shown as being currently located within a working memory 736, including an operating system 740 and/or other code 744. It should be appreciated that alternate embodiments of a computer system 700 may have numerous variations from that described above. For example, customized hardware might also be used and/or particular elements might be implemented in hardware, software (including portable software, such as applets), or both. Further, connection to other computing devices such as network input/output devices may be employed.

Examples of the processors 340, 708 as described herein may include, but are not limited to, at least one of Qualcomm® Snapdragon® 800 and 801, Qualcomm® Snapdragon® 620 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

Figure 8A:
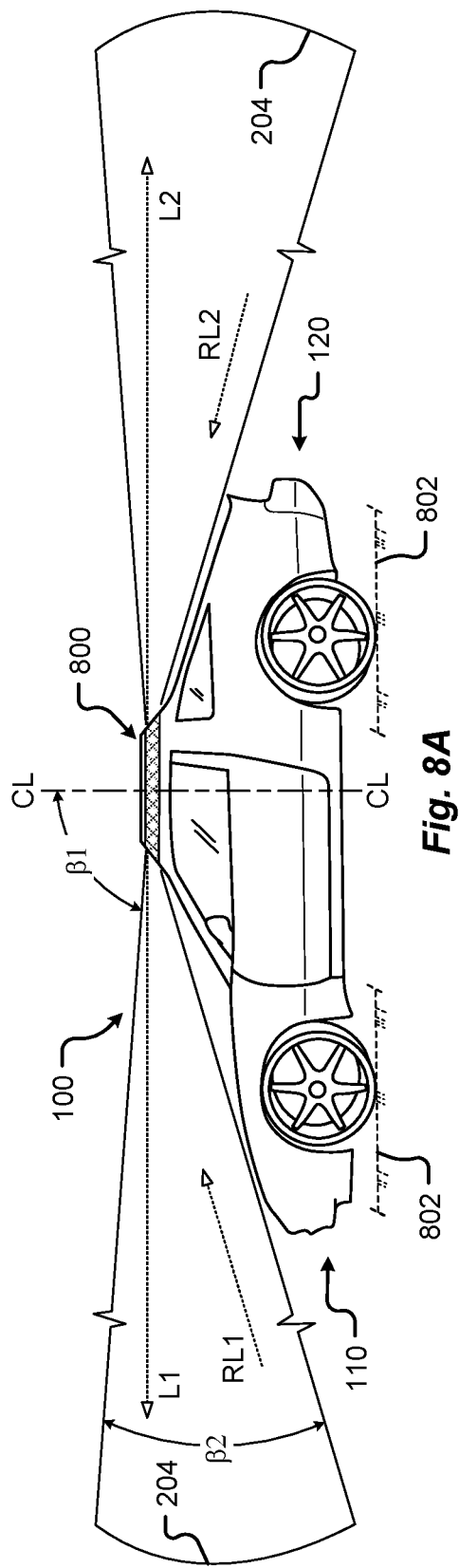
FIG. 8A shows a side view of a vehicle and a low-profile imaging system and imaging environment in accordance with embodiments of the present disclosure.

FIG. 8A shows a side view of a vehicle 100 and a low-profile imaging system 800 and imaging environment in accordance with embodiments of the present disclosure. In particular, the low-profile imaging system 800 may conform to, be integrated with, and/or match at least one portion of the body of the vehicle 100. As shown in FIG. 8A, the low-profile imaging system 800 may include features that match, or substantially conform to, an aerodynamic shape, draft angle, windshield, roof 130, and/or other feature of the vehicle 100. The low-profile imaging system 800 may provide imaging capabilities for a vehicle 100 (e.g., similar, if not identical, to the imaging of the LIDAR imaging systems 112, 320 described above, etc.) without negatively affecting a drag coefficient for the vehicle 100. Additionally or alternatively, embodiments of the low-profile imaging system 800 described herein may provide an integral LIDAR imaging system that does not obviously protrude or extend from a portion of the vehicle 100. In some embodiments, a periphery of the low-profile imaging system 800 may coincide with a vehicle roof 130. For example, a lens or light-transmissive optics shield of the low-profile imaging system 800 may coincide with, or form, a portion of the vehicle roof 130.

The low-profile imaging system 800 may include one or more sensors and optics configured to provide ranging and imaging that is similar, if not identical, to the ranging and imaging system 112 and/or the LIDAR sensors 320 described in conjunction with FIGS. 1-3. In some embodiments, the low-profile imaging system 800 may include at least one LIDAR sensor 320. For instance, the low-profile imaging system 800 may be configured to detect visual information in an environment surrounding the vehicle 100. The visual information detected in the environment surrounding the vehicle 100 and low-profile imaging system 800 may be processed (e.g., via one or more sensor and/or system processors, etc.) to generate a complete 360-degree view of an environment around the vehicle 100. The low-profile imaging system 800 may be configured to generate changing 360-degree views of the environment in real-time, for instance, while the vehicle 100 is driving, turned on, or stationary. In some cases, the low-profile imaging system 800 may have an effective detection limit 204 or range that is some distance from a center of the vehicle 100 outward over 360 degrees. The effective detection limit 204 of the low-profile imaging system 800 defines a view zone 208 (e.g., refer to FIG. 8B) that corresponds to an area and/or volume, etc., surrounding the vehicle 100. Any object falling outside of the view zone 208 may be in the undetected zone 212 and may not be detected by the low-profile imaging system 800 of the vehicle 100.

As shown in FIG. 8A, the low-profile imaging system 800 may be oriented on a roof 130 of a vehicle 100 such that a 360-degree view around the vehicle 100 can be obtained. The 360-degree view around the vehicle 100 may be defined by a position of a centerline CL of the low-profile imaging system 800 relative to the vehicle 100. In some embodiments, the low-profile imaging system 800 may be configured to emit laser light in a direction outwardly from the centerline CL of the low-profile imaging system 800. The emitted laser light may correspond to a plurality of laser beams, or channels, that are emitted by a LIDAR sensor 320 associated with the low-profile imaging system 800. Returned light (e.g., reflected echo, etc.) may be detected by a photodiode receiver, or equivalent, of the low-profile imaging system 800.

The low-profile imaging system 800 may include a vertical field of view and viewing angle $\beta 2$. This vertical field of view may be defined by an upper viewing limit and a lower viewing limit. In some embodiments, the upper viewing limit may be defined by a limit angle $\beta 1$ that is measured from the centerline CL of the low-profile imaging system 800 to an uppermost effective detection position for the system 800. The lower viewing limit may be defined by a viewing angle $\beta 2$ that is measured from the upper viewing limit to a lowermost effective detection position for the system 800.

Although shown as emitting light along a directional vector that is perpendicular to the centerline CL of the low-profile imaging system 800 (i.e., parallel to the roadway 802), it should be appreciated that the beams of laser light emitted from the low-profile imaging system 800 may be angularly emitted, may vary in angle between channels and/or pulses, and may even take up a portion of the field of view $\beta 2$. For the sake of clarity, a single beam of light may be used herein to represent light emitted by a LIDAR sensor, laser, or other light-emitting element.

In one embodiment, the light emitted by the low-profile imaging system 800 may be transmitted in pulses. FIG. 8A shows a first pulse of light (L1) emitted at a first time and a second pulse of light L2 emitted at a second subsequent time. In some embodiments, the low-profile imaging system 800 may detect returned light RL1, RL2 within the field of view viewing angle $\beta 2$. For instance, a first returned light RL1 is traveling along a first vector in the field of view from the front 110 of the vehicle 100 to the centerline CL of the low-profile imaging system 800 and a second returned light RL2 is traveling along a second vector in the field of view from the rear 120 of the vehicle to the centerline CL of the low-profile imaging system 800. As can be appreciated, the low-profile imaging system 800 may be configured to detect any light that is returned within the field of view of the system 800.

Figure 8B:
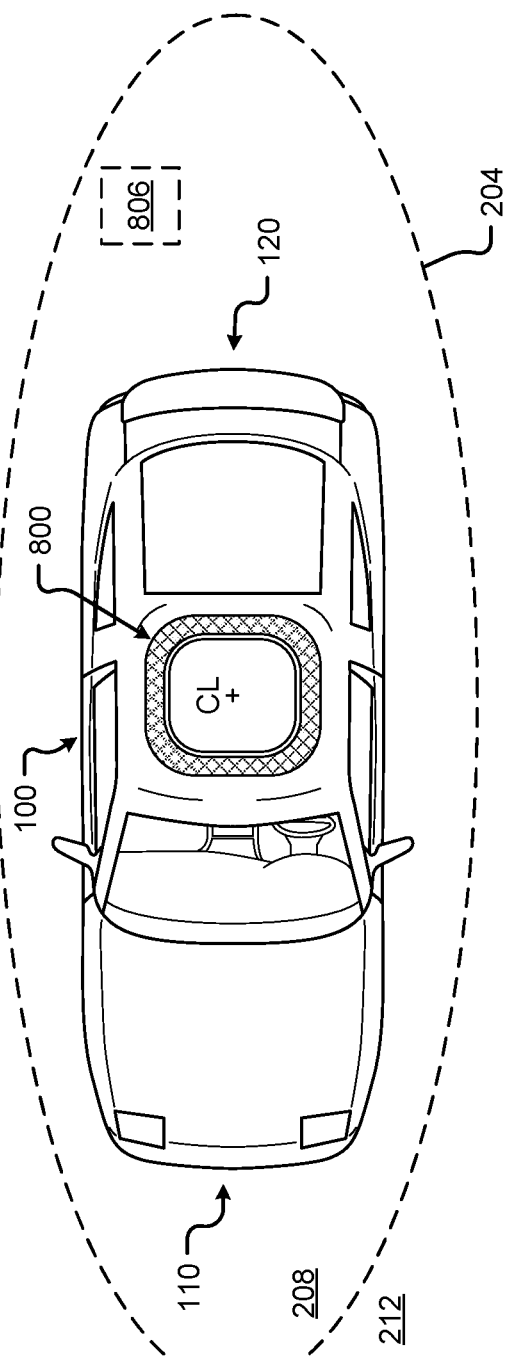
FIG. 8B shows a plan view of a vehicle and a low-profile imaging system and imaging environment in accordance with embodiments of the present disclosure.

FIG. 8B shows a plan view of a vehicle 100 and the low-profile imaging system 800 and an imaging environment in accordance with embodiments of the present disclosure. As shown in FIG. 8B, a periphery of the low-profile imaging system 800 may be included in the roof 130 of the vehicle 100. The hatched portion of the low-profile imaging system 800 shown in FIGS. 8A-B may represent the lens or light-transmissive optics shield of the low-profile imaging system 800. As described above, the low-profile imaging system 800 may provide a 360-degree view of an environment around the vehicle 100. Although shown as an ellipse, it should be appreciated that the 360-degree view of the environment around the vehicle 100 is not so limited. For instance, the low-profile imaging system 800 may define a view zone 208 having an outer extent, periphery, limit, or effective detection limit 204 that has a distance that is equidistant from the centerline CL of the low-profile imaging system 800 at any point around the vehicle 100 (e.g., around 360 degrees). The low-profile imaging system 800 may be configured to detect targets 806 inside an area, volume, and/or space defining the view zone 208. In some embodiments, the low-profile imaging system 800 may not be able to detect targets in an area, volume, or space outside the view zone 208. This outer region may be referred to as the undetected zone 212.

By way of example, the low-profile imaging system 800 may emit light over 360 degrees around the vehicle 100 and in the view zone 208 shown in FIG. 8B. In some cases, this emitted light may reflect off at least one target 806 inside the view zone 208 and return to the low-profile imaging system 800. As the light returned from the target 806 may include a number of different angles of reflection and differences between light emission times and light receiving times (or time of flight characteristics), the low-profile imaging system 800 can determine a shape, size, and even location of the target 806 relative to the vehicle 100.

Figure 9A:
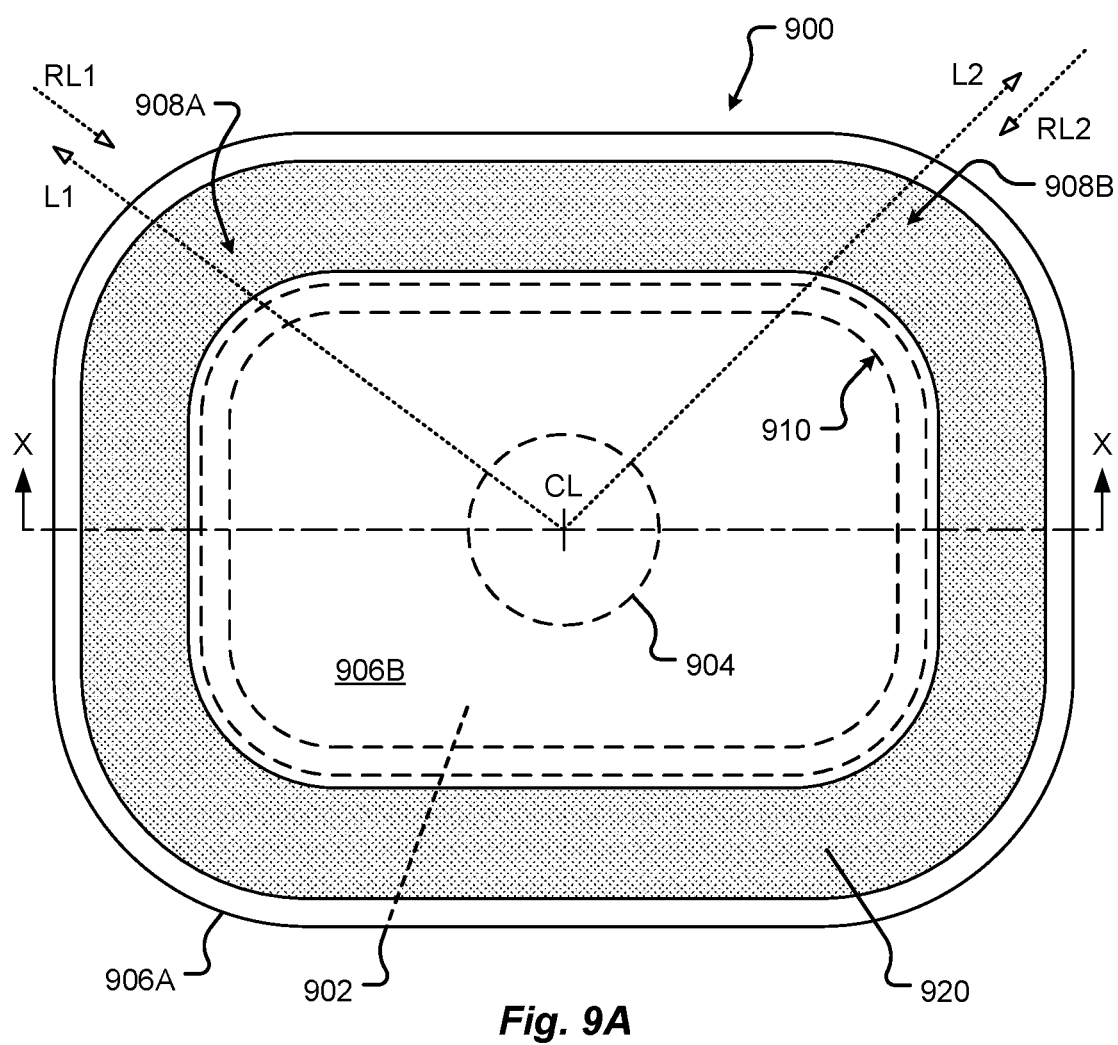
FIG. 9A shows a plan view of the low-profile imaging system in accordance with embodiments of the present disclosure.
Figure 9B:
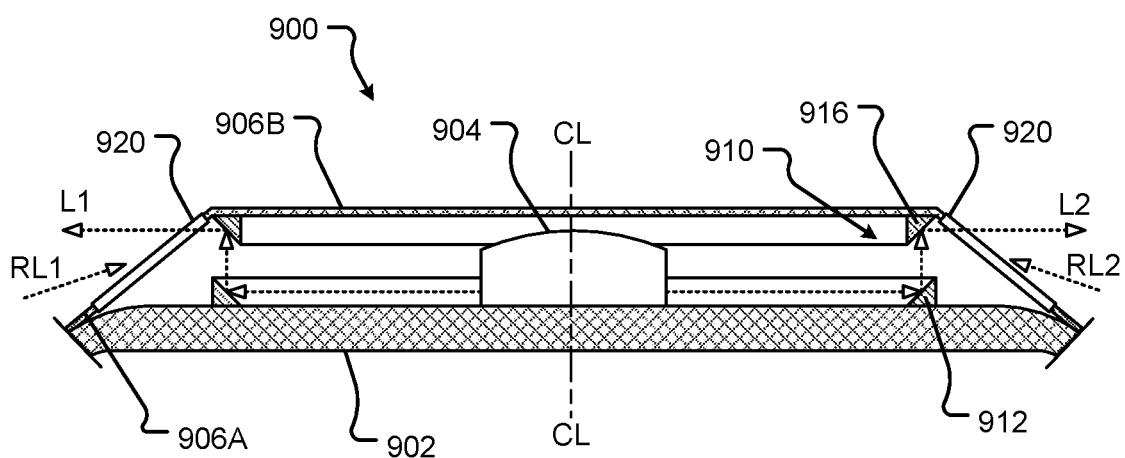
FIG. 9B is a cross-sectional view taken along line X-X of FIG. 9A showing an arrangement of the low-profile imaging system components in accordance with embodiments of the present disclosure.

FIGS. 9A-9C show views of the low-profile imaging system 900 in accordance with embodiments of the present disclosure. The low-profile imaging system 900 shown in FIGS. 9A-9C may be the same as the low-profile imaging system 800 described in conjunction with FIGS. 8A and 8B. In some embodiments, the low-profile imaging system 900 may include a base 902, a LIDAR sensor 904, a first support member 906A, a second support member 906B, and a lens or light-transmissive optics shield 920. In one embodiment, one or more of the base 902, first support member 906A, second support member 906B, and/or lens 920 may form a housing of the low-profile imaging system. Additionally, the low-profile imaging system 900 may include an optics assembly 910 comprising a first reflective element 912, a second reflective element 916.

In some embodiments, the base 902 of the low-profile imaging system 900 may comprise an optical mount area configured to accurately maintain the LIDAR sensor 904 in a position relative to the optics assembly 910. For instance, the LIDAR sensor 904 may be mounted or attached to the base 902 in a center, or a central portion, of an area of the base 902. In one embodiment, the optical mount area may be configured as an optical bench, optical table, and/or a rigid planar member having one or more mount locations for the LIDAR sensor 904, first support member 906A, and/or the optics assembly 910. These components of the low-profile imaging system 900 may be mounted to the base 902 via one or more fasteners and/or attachments. In some embodiments, at least one of the components (e.g., the LIDAR sensor 904, first reflective element 912, second reflective element 916, lens 920, etc.) may be selectively attached (e.g., removably attached) to the base 902 or other portion of the low-profile imaging system 900. In some embodiments, at least one of the components (e.g., the first reflective element 912, second reflective element 916, lens 920, etc.) may be formed as part of the base 902, first support member 906A, second support member 906B, and/or other portion of the low-profile imaging system 900. In one embodiment, the base 902 may be, or form, a part of the roof 130 of the vehicle 100. As can be appreciated, the base 902 may be made from one or more of metal (e.g., aluminum, steel, titanium, Inconel, nickel, etc., and/or alloys thereof), plastic, ceramic, glass, or other rigid material.

The LIDAR sensor 904 of the low-profile imaging system 900 may correspond to the LIDAR sensor 320 described in conjunction with FIG. 3. In some embodiments, the LIDAR sensor 904 may be a solid state sensor, and as such, may not include moving parts.

The first support member 906A of the low-profile imaging system 900 may be attached to the base 902 or other part of the vehicle 100. In one embodiment, the first support member 906A may be formed as part of the base 902. In some embodiments, the first support member 906A may be welded, adhered, crimped, fastened, affixed, molded, and/or otherwise mounted to the base 902 or the vehicle 100. The first support member 906A may provide a support feature configured to receive, capture, hold, and/or otherwise support a lens 920 of the low-profile imaging system 900. The first support member 906A may include a height or dimension relative to the base 902 at least partially defining a distance between components (e.g., the first reflective element 912 and second reflective element 916, etc.) in the optics assembly 910. The first support member 906A may be made from a similar or different material as the base 902 described.

The second support member 906B of the low-profile imaging system 900 may be attached to one or more of the lens 920, first support member 906A, base 902, or some other part of the vehicle 100 (e.g., the roof 130, etc.). In some embodiments, this attachment may include, but is in no way limited to, an interface that is welded, adhered, crimped, fastened, affixed, molded, and/or otherwise secured. The second support member 906B may provide a support feature configured to receive, capture, hold, and/or otherwise support the lens 920 of the low-profile imaging system 900. In some embodiments, the second support member 906 may include an optical mount area or rigid planar surface having one or more mount locations for a portion of the optics assembly 910. For instance, the second support member 906 may comprise at least one mount area for the second reflective element 916. The second reflective element 916 may be mounted via one or more fasteners and/or attachments. In some embodiments, the second reflective element 916 may be selectively attached (e.g., removably attached) to the second support member 906B or other portion of the low-profile imaging system 900. In some embodiments, the second reflective element 916 may be formed as part of the base second support member 906B and/or other portion of the low-profile imaging system 900. The second support member 906B may be made from one or more of metal, plastic, ceramic, glass, or other rigid material as described herein.

The lens 920 may be configured as a light-transmissive element disposed between the first support member 906A and the second support member 906B. The lens 920 may allow light (e.g., laser light, etc.) emitted by the LIDAR sensor 904 to pass therethrough. In some embodiments, the lens 920 may include a filter (e.g., coating, layer, film, deposition, etc.) configured to only allow specific wavelengths of light to pass therethrough. Additionally or alternatively, the lens 920 may be configured to protect the components of the low-profile imaging system 900. In some embodiments, the lens 920 may be made from high-strength glass, tempered glass, laminate, plastic, crystal, etc., and/or combinations thereof. In some embodiments, the lens 920 may be formed as part of the low-profile imaging system 900 joining the first support member 906A to the second support member 906B. In one embodiment, the first support member 906A, the lens 920, and the second support member 906B may be formed from plastic.

The first and/or second reflective elements 912, 916 may comprise an optical mirror having at least one reflective surface. The reflective surface may include a shape (e.g., planar, flat, curved, concave, convex, etc., and/or combinations thereof) configured to reflect light in a particular manner (e.g., focusing, steering, or directing light, etc.). In some embodiments, the first and second reflective elements 912, 916 may include a reflective surface optimized for a specific wavelength of light (e.g., laser light, etc.). The first and second reflective elements 912, 916 may be made from metal, silica (e.g., fused silica, etc.), glass (e.g., chemically resistant, low thermal expansion, etc.), plastic, etc., and/or combinations thereof. In some embodiments, the reflective surface of the first and/or second reflective elements 912, 916 may include at least one coating (e.g., metal, dielectric, thin-film, etc.) disposed thereon.

In some embodiments, the first and/or second reflective elements 912, 916 may form a continuous reflective light directing surface surrounding the LIDAR sensor 904. As shown in FIGS. 9A-9C, the reflective surfaces of the first and second reflective elements 912, 916 may be formed as part of the optics assembly 910 in a continuously uninterrupted surface shape surrounding the LIDAR sensor 904. For example, the shape of the reflective surface may be substantially rectangular having radiused or rounded corners (see, e.g., the plan view of the optics assembly 910 shape in FIG. 9A) around the LIDAR sensor 904. In this example, the reflective surface plan view shape may match an offset shape of a periphery of the low-profile imaging system 900, the lens 920, first support member 906A, and/or second support member 906B. In some embodiments, the plan view shape of the reflective surface may be substantially circular. In any event, the plan view shape of the reflective surface may be configured such that light emitted from the LIDAR sensor 904 is directed outwardly from the low-profile imaging system 900 at any emission angle (over 360 degrees) about the centerline CL via the reflective surfaces. In some embodiments, the shape of the first reflective element 912 around the LIDAR sensor 904 may substantially match the shape of the second reflective element 916 that is disposed around the LIDAR sensor 904.

Referring to FIG. 9A, a plan view of the low-profile imaging system 900 is shown in accordance with embodiments of the present disclosure. As described, light emitted from the LIDAR sensor 904 may be guided by the optics assembly 910 (e.g., the first and second reflective members 912, 916, etc.) through the lens 920. FIG. 9A shows light L1 emitted from the low-profile imaging system 900 at a first area 908A and light L2 emitted from the low-profile imaging system 900 at a second area 908B. In some embodiments, the LIDAR sensor 904 may be configured to emit light progressively in a clockwise, or counterclockwise, rotation around the centerline CL of the low-profile imaging system 900 (e.g., the central axis of the LIDAR sensor 904). In one embodiment, the emitted light L1 arrow may represent light emitted by the LIDAR sensor 904 at a first time, while the emitted light L2 arrow may represent light emitted by the LIDAR sensor 904 at a later, or subsequent, time. In any event, reflection echo (or light returned from hitting a target) may be detected by the LIDAR sensor 904 receiving the returned light RL1, RL2 in, or near, the respective area 908A, 908B from which the sensing light L1, L2 was emitted.

FIG. 9B is a cross-sectional view taken along line X-X of FIG. 9A showing an arrangement of the low-profile imaging system 900 components in accordance with embodiments of the present disclosure. In particular, FIG. 9B shows the arrangement of the first reflective member 912 and the second reflective member 916 in the low-profile imaging system 900. As shown in FIG. 9B, at least a portion of the LIDAR sensor 904 may be disposed in a center of the first reflective member 912 (e.g., at the centroid of the first reflective member 912 outer periphery shape). Light emitted from the LIDAR sensor 904 may be aimed at the first reflective element 912. The first reflective element 912 may include an angled reflective surface configured, or angled, to direct the light emitted from the LIDAR sensor 904 toward the second reflective element 916. In FIGS. 9B and 9C, the first and second reflective elements 912, 916 are shown disposed opposite to one another. However, the angled reflective surface of the second reflective element 916 may be configured, or angled, to direct the light emitted from the LIDAR sensor 904 outwardly from the low-profile imaging system 900 through the lens 920. For instance, the angled reflective surface of the first reflective element 916 may be disposed at 45 degrees to a plane perpendicular with the centerline CL. In some embodiments, the angled reflective surface of the second reflective element 916 may also be disposed at 45 degrees to a plane perpendicular with the centerline CL. While the first and second reflective elements 912, 916 of FIGS. 9A-9C show the reflective surfaces thereof disposed at 45 degrees, embodiments of the present disclosure are not so limited. In any event, the angular relationship of the first and second reflective elements 912, 916 may be configured to direct light from and/or receive by the LIDAR sensor 904 in a low-profile (e.g., low-height, minimal vertical dimension, etc.) imaging system package. In some embodiments, the angle of a reflective surface may be fixed or adjustable. In one embodiment an overall height of the low-profile imaging system 900 may be less than a dimension measured from the LIDAR sensor 904 to the optics assembly 910 or to the first and second reflective elements 912, 916.

FIG. 9C shows a detail view of a portion of the cross-sectional view of FIG. 9B showing, among other things, an optics assembly 910 of the low-profile imaging system 900 in accordance with embodiments of the present disclosure. As shown in FIG. 9B, light may be emitted from the LIDAR sensor 904 as generally illustrated by arrows, or rays, LN. Although shown as emitting light along a directional vector that is perpendicular to the centerline CL of the low-profile imaging system 900, it should be appreciated that pulses and/or beams of laser light emitted from the low-profile imaging system 900 may be emitted from the LIDAR sensor 904 at any angle within the optics assembly field of view defined by view angle β2. In some embodiments, different wavelengths of light may be emitted by the LIDAR sensor 904 at different angles from one another. For the sake of clarity, a single beam of light may be used herein to represent light emitted by a LIDAR sensor, laser, or other light-emitting element. Additionally or alternatively, returned light (e.g., reflection echo, etc.) may travel from outside of the low-profile imaging system 900 to a sensing element of the LIDAR sensor 904 inside the low-profile imaging system 900 via at least one path within the optics assembly field of view defined by view angle β2. In some embodiments, the second reflective element 916 may be disposed above (e.g., directly above, etc.) the first reflective element 912 in the low-profile imaging system 900.

FIGS. 10A-10C show schematic views of an adjustable optics assembly of an embodiment of the low-profile imaging system 900. In some embodiments, one or more components of the adjustable optics assembly shown in FIGS. 10A-10C may replace one or more components of the optics assembly 910 described in conjunction with FIGS. 9A-9C. The adjustable optics assembly shown in FIGS. 10A-10C may include an adjustable reflective element 1012 (e.g., having an adjustable reflective surface) and a fixed-position reflective element (e.g., having a fixed reflective surface). The adjustable reflective element 1012 may be similar (e.g., in structure, position, etc.) to the first reflective element 912 described in conjunction with FIGS. 9A-9C. The fixed-position reflective element 1016 may be similar, if not identical (e.g., in structure, position, etc.), to the second reflective element 916 described in conjunction with FIGS. 9A-9C. In some embodiments, the adjustable reflective element 1012 may include at least one reflective surface that can selectively move, or rotate, about a pivot point. For instance, the adjustable reflective element 1012 may comprise one or more microelectromechanical systems (MEMS) mirrors that are configured to tilt, rotate, or move about a pivot point 1004. In one embodiment, the reflective surface may be caused to tilt, or pivot, about the pivot point 1004 via a cam actuation, oscillation, piezoelectric actuation, solenoid actuation, and/or the like. In some embodiments, the adjustable reflective element 1012 may be adjusted to increase, alter, or change an angle defining the sensing field of view for the LIDAR sensor 904. In some cases, the adjustment may be made to a mount for the adjustable reflective element 1012 (e.g., a moveable, and/or pivoting mount, etc.).

FIG. 10A shows a schematic view of an adjustable optics assembly of an embodiment of the low-profile imaging system 900 in a first position 1000A. In some embodiments, the first position 1000A may correspond to an unadjusted, or default, position for the adjustable reflective element 1012 and adjustable optics assembly. In the first position 1000A, light emitted from the LIDAR sensor 904 may be directed (e.g., via reflection) from the adjustable reflective element 1012 to the fixed-position reflective element 1016 along a direction and angle illustrated by arrow group LP1, away from the imaging system.

FIG. 10B shows a schematic view of an adjustable optics assembly of an embodiment of the low-profile imaging system 900 in a second position 1000B. In some embodiments, the second position 1000B may correspond to a first adjusted position where the adjustable reflective element 1012 has been tilted and/or rotated (e.g., in a counterclockwise direction about the pivot point 1004 of the adjustable reflective element 1012). In the first adjusted position 1000B, light emitted from the LIDAR sensor 904 may be directed (e.g., via reflection) from the adjustable reflective element 1012 in the first adjusted position to the fixed-position reflective element 1016 along a direction and angle illustrated by adjusted arrow LP2. As illustrated FIG. 10B, the adjustment made to the adjustable reflective element 1012 causes the angle of departure (e.g., reflection angle) of the light reflected by the fixed-position reflective element 1016 to change relative to a reference line 1002. In some embodiments, the reference line 1002 may correspond to a line along which the light in the unadjusted position of FIG. 10A (e.g., LP1) is directed from the fixed-position reflective element 1016. As shown in FIG. 10B, the emitted light directed along arrow LP2 has been adjusted to travel in a direction defined by first angle $\theta 1$ measured from (e.g., below) the reference line 1002.

FIG. 10C shows a schematic view of an adjustable optics assembly of an embodiment of the low-profile imaging system 900 in a third position 1000C. In some embodiments, the third position 1000C may correspond to a second adjusted position where the adjustable reflective element 1012 has been tilted and/or rotated (e.g., in a clockwise direction about the pivot point 1004 of the adjustable reflective element 1012). In the second adjusted position 1000C, light emitted from the LIDAR sensor 904 may be directed (e.g., via reflection) from the adjustable reflective element 1012 in the second adjusted position to the fixed-position reflective element 1016 along a direction and angle illustrated by adjusted arrow LP3. As illustrated FIG. 10C, the adjustment made to the adjustable reflective element 1012 causes the angle of departure (e.g., reflection angle) of the light reflected by the fixed-position reflective element 1016 to change relative to the reference line 1002. As shown in FIG. 10C, the emitted light directed along arrow LP3 has been adjusted to travel in a direction defined by second angle $\theta 2$ measured from (e.g., above) the reference line 1002.

As can be appreciated, the degree or angle of pivot associated with the adjustable reflective element 1012 can alter the departure angle of light from the fixed-position reflective element 1016. In some embodiments, the departure angle of light, or even pulses of light, from the optics assembly may be controlled (e.g., at any angle between the first angle $\theta 1$ and the second angle $\theta 2$) by varying a degree of rotation of the adjustable reflective element 1012. Additionally or alternatively, returned light (e.g., reflection echo, etc.) may be returned to the LIDAR sensor 904 when directed toward the reflective elements 1016, 1012 from outside of the optics assembly and imaging system and traveling within any path defined by the first angle $\theta 1$ and the second angle $\theta 2$.

FIGS. 11A-11C show schematic views of an adjustable optics assembly of an embodiment of the low-profile imaging system 900. In some embodiments, one or more components of the adjustable optics assembly shown in FIGS. 11A-11C may replace one or more components of the optics assembly 910 described in conjunction with FIGS. 9A-9C. The adjustable optics assembly shown in FIGS. 11A-11C may include a fixed-position reflective element 1112 (e.g., having a fixed reflective surface) and an adjustable reflective element 1116 (e.g., having an adjustable reflective surface). The fixed-position reflective element 1112 may be similar, if not identical (e.g., in structure, position, etc.), to the first reflective element 912 described in conjunction with FIGS. 9A-9C. The adjustable reflective element 1116 may be similar (e.g., in structure, position, etc.) to the second reflective element 916 described in conjunction with FIGS. 9A-9C. In some embodiments, the adjustable reflective element 1116 may include at least one reflective surface that can selectively move, or rotate, about a pivot point 1104. For instance, the adjustable reflective element 1116 may comprise one or more MEMS mirrors that are configured to tilt, rotate, or move about a pivot point 1104. In one embodiment, the reflective surface may be caused to tilt, or pivot, about the pivot point 1104 via a cam actuation, oscillation, piezoelectric actuation, solenoid actuation, and/or the like. In some embodiments, the adjustable reflective element 1116 may be adjusted to increase, alter, or change an angle defining the sensing field of view for the LIDAR sensor 904. In some cases, the adjustment may be made to a mount for the adjustable reflective element 1116 (e.g., a moveable, and/or pivoting mount, etc.).

FIG. 11A shows a schematic view of an adjustable optics assembly of an embodiment of the low-profile imaging system 900 in a first position 1100A. In some embodiments, the first position 1100A may correspond to an unadjusted, or default, position for the adjustable reflective element 1116 and adjustable optics assembly. In the first position 1100A, light emitted from the LIDAR sensor 904 may be directed (e.g., via reflection) from the fixed-position reflective element 1112 to the adjustable reflective element 1116 along a direction and angle illustrated by arrow group LP1, away from the imaging system.

FIG. 11B shows a schematic view of an adjustable optics assembly of an embodiment of the low-profile imaging system 900 in a second position 1100B. In some embodiments, the second position 1100B may correspond to a first adjusted position where the adjustable reflective element 1116 has been tilted and/or rotated (e.g., in a counterclockwise direction about the pivot point 1104 of the adjustable reflective element 1116). In the first adjusted position 1100B, light emitted from the LIDAR sensor 904 may be directed (e.g., via reflection) from the fixed-position reflective element 1112 to the adjustable reflective element 1116 in the first adjusted position along a direction and angle illustrated by adjusted arrow LP2. As illustrated FIG. 11B, the adjustment made to the adjustable reflective element 1116 causes the angle of departure (e.g., reflection angle) of the light reflected by the adjustable reflective element 1116 to change relative to a reference line 1102. In some embodiments, the reference line 1102 may correspond to a line along which the light in the unadjusted position of FIG. 11A (e.g., LP1) is directed from the adjustable reflective element 1116. As shown in FIG. 11B, the emitted light directed along arrow LP2 has been adjusted to travel in a direction defined by first angle $\theta 1$ measured from (e.g., above) the reference line 1102.

FIG. 11C shows a schematic view of an adjustable optics assembly of an embodiment of the low-profile imaging system 900 in a third position 1100C. In some embodiments, the third position 1100C may correspond to a second adjusted position where the adjustable reflective element 1116 has been tilted and/or rotated (e.g., in a clockwise direction about the pivot point 1104 of the adjustable reflective element 1116). In the second adjusted position 1100C, light emitted from the LIDAR sensor 904 may be directed (e.g., via reflection) from the fixed-position reflective element 1112 to the adjustable reflective element 1116 in the second adjusted position along a direction and angle illustrated by adjusted arrow LP3. As illustrated FIG. 11C, the adjustment made to the adjustable reflective element 1116 causes the angle of departure (e.g., reflection angle) of the light reflected by the adjustable reflective element 1116 to change relative to the reference line 1102. As shown in FIG. 11C, the emitted light directed along arrow LP3 has been adjusted to travel in a direction defined by second angle θ2 measured from (e.g., below) the reference line 1102.

As can be appreciated, the degree or angle of pivot associated with the adjustable reflective element 1116 can alter the departure angle of light therefrom. In some embodiments, the departure angle of light, or even pulses of light, from the optics assembly may be controlled (e.g., at any angle between the first angle θ1 and the second angle θ2) by varying a degree of rotation of the adjustable reflective element 1116. Additionally or alternatively, returned light (e.g., reflection echo, etc.) may be returned to the LIDAR sensor 904 when directed toward the reflective elements 1116, 1112 from outside of the optics assembly and imaging system and traveling within any path defined by the first angle θ1 and the second angle θ2.

FIGS. 12A-12C show schematic views of an adjustable optics assembly of an embodiment of the low-profile imaging system 900. In some embodiments, one or more components of the adjustable optics assembly shown in FIGS. 12A-12C may replace one or more components of the optics assembly 910 described in conjunction with FIGS. 9A-9C. The adjustable optics assembly shown in FIGS. 12A-12C may include a first adjustable reflective element 1212 (e.g., having a first adjustable reflective surface) and a second adjustable reflective element 1216 (e.g., having a second adjustable reflective surface). The first adjustable reflective element 1212 may be similar, if not identical (e.g., in structure, position, etc.), to the first reflective element 912 described in conjunction with FIGS. 9A-9C. The second adjustable reflective element 1216 may be similar (e.g., in structure, position, etc.) to the second reflective element 916 described in conjunction with FIGS. 9A-9C. In some embodiments, the first and second adjustable reflective elements 1212, 1216 may include at least one reflective surface that can selectively move, or rotate, about a pivot point 1204A, 1204B. For instance, the first and/or second adjustable reflective element 1212, 1216 may comprise one or more MEMS mirrors that are configured to tilt, rotate, or move about a pivot point 1204A, 1204B associated with the MEMS mirrors. In one embodiment, the reflective surface may be caused to tilt, or pivot, about the pivot point 1204A, 1204B via a cam actuation, oscillation, piezoelectric actuation, solenoid actuation, and/or the like. In some embodiments, the adjustable reflective elements 1212, 1216 may be adjusted to increase, alter, or change an angle defining the sensing field of view for the LIDAR sensor 904. In some cases, the adjustment may be made to a mount for the adjustable reflective elements 1212, 1216 (e.g., a moveable, and/or pivoting mount, etc.).

Using adjustable first and the second adjustable reflective elements 1212, 1216 allows the optics assembly to make greater angular changes with relatively small angular adjustments to each adjustable reflective elements 1212, 1216. In some cases, the angle of adjustment made to each of the reflective elements 1212, 1216 shown in FIGS. 12A-12C may be less than the angle of adjustment made to a single reflective element 1012, 1116 illustrated in conjunction with FIGS. 10A-10C and 11A-11C, respectively, to replicate the same first angle θ1 and the second angle θ2 illustrated.

FIG. 12A shows a schematic view of an adjustable optics assembly of an embodiment of the low-profile imaging system 900 in a first position 1200A. In some embodiments, the first position 1200A may correspond to an unadjusted, or default, position for each of the adjustable reflective elements 1212, 1216 and the adjustable optics assembly. In the first position 1200A, light emitted from the LIDAR sensor 904 may be directed (e.g., via reflection) from the first adjustable reflective element 1212 to the second adjustable reflective element 1216 along a direction and angle illustrated by arrow group LP1, in a direction away from the imaging system.

FIG. 12B shows a schematic view of an adjustable optics assembly of an embodiment of the low-profile imaging system 900 in a second position 1200B. In some embodiments, the second position 1200B may correspond to a first adjusted position where the first adjustable reflective element 1212 has been tilted and/or rotated (e.g., in a counterclockwise direction about the pivot point 1204A of the first adjustable reflective element 1212) and where the second adjustable reflective element 1216 has been tilted and/or rotated (e.g., in a clockwise direction about the pivot point 1204B of the second adjustable reflective element 1216). In the first adjusted position 1200B, light emitted from the LIDAR sensor 904 may be directed (e.g., via reflection) from the first adjustable reflective element 1212 to the second adjustable reflective element 1216 in the first adjusted position along a direction and angle illustrated by adjusted arrow LP2. As illustrated FIG. 12B, the adjustments made to the adjustable reflective elements 1212, 1216 causes the angle of departure (e.g., reflection angle) of the light reflected by the second adjustable reflective element 1216 to change relative to a reference line 1202. In some embodiments, the reference line 1202 may correspond to a line along which the light in the unadjusted position of FIG. 12A (e.g., LP1) is directed from the second adjustable reflective element 1216. As shown in FIG. 12B, the emitted light directed along arrow LP2 has been adjusted to travel in a direction defined by first angle θ1 measured from (e.g., below) the reference line 1202.

FIG. 12C shows a schematic view of an adjustable optics assembly of an embodiment of the low-profile imaging system 900 in a third position 1200C. In some embodiments, the third position 1200C may correspond to a second adjusted position where the first adjustable reflective element 1212 has been tilted and/or rotated (e.g., in a clockwise direction about the pivot point 1204A of the first adjustable reflective element 1212) and where the second adjustable reflective element 1216 has been tilted and/or rotated (e.g., in a counterclockwise direction about the pivot point 1204B of the second adjustable reflective element 1216). In the second adjusted position 1200C, light emitted from the LIDAR sensor 904 may be directed (e.g., via reflection) from the first adjustable reflective element 1212 to the second adjustable reflective element 1216 in the second adjusted position along a direction and angle illustrated by adjusted arrow LP3. As illustrated FIG. 12C, the adjustments made to the adjustable reflective elements 1212, 1216 cause the angle of departure (e.g., reflection angle) of the light reflected by the second adjustable reflective element 1216 to change relative to the reference line 1202. As shown in FIG. 12C, the emitted light directed along arrow LP3 has been adjusted to travel in a direction defined by second angle θ2 measured from (e.g., above) the reference line 1202.

As can be appreciated, the degree or angle of pivot associated with the adjustable reflective elements 1212, 1216 can alter the departure angle of light therefrom. In some embodiments, the departure angle of light, or even pulses of light, from the optics assembly may be controlled (e.g., at any angle between the first angle θ1 and the second angle θ2) by varying a degree of rotation of any one or more of the adjustable reflective elements 1212, 1216. For instance, the light may be directed by rotating one of the reflective elements 1212, 1216 while not adjusting the other of the reflective elements 1212, 1216. Additionally or alternatively, returned light (e.g., reflection echo, etc.) may be returned to the LIDAR sensor 904 when directed toward the adjustable reflective elements 1216, 1212 from outside of the optics assembly and imaging system and traveling within any path defined by the first angle θ1 and the second angle θ2.

In some embodiments, the adjustable reflective elements 1012, 1116, 1212, 1216 may be used as fixed reflective elements in the direction of light through the optics assembly. In other words, at least one adjustable reflective elements 1012, 1116, 1212, 1216 may be included in the optics assembly but is not required to be adjusted to direct light. In one embodiment, the angle of the at least one adjustable reflective elements 1012, 1116, 1212, 1216 may be continually adjusted (e.g., via an oscillation, or oscillating motion, between first angle θ1 and the second angle θ2), for instance, to direct light emitted especially as it is progressively or sequentially emitted about a periphery, or 360-degree circle, of the LIDAR sensor 904.

Figure 13:
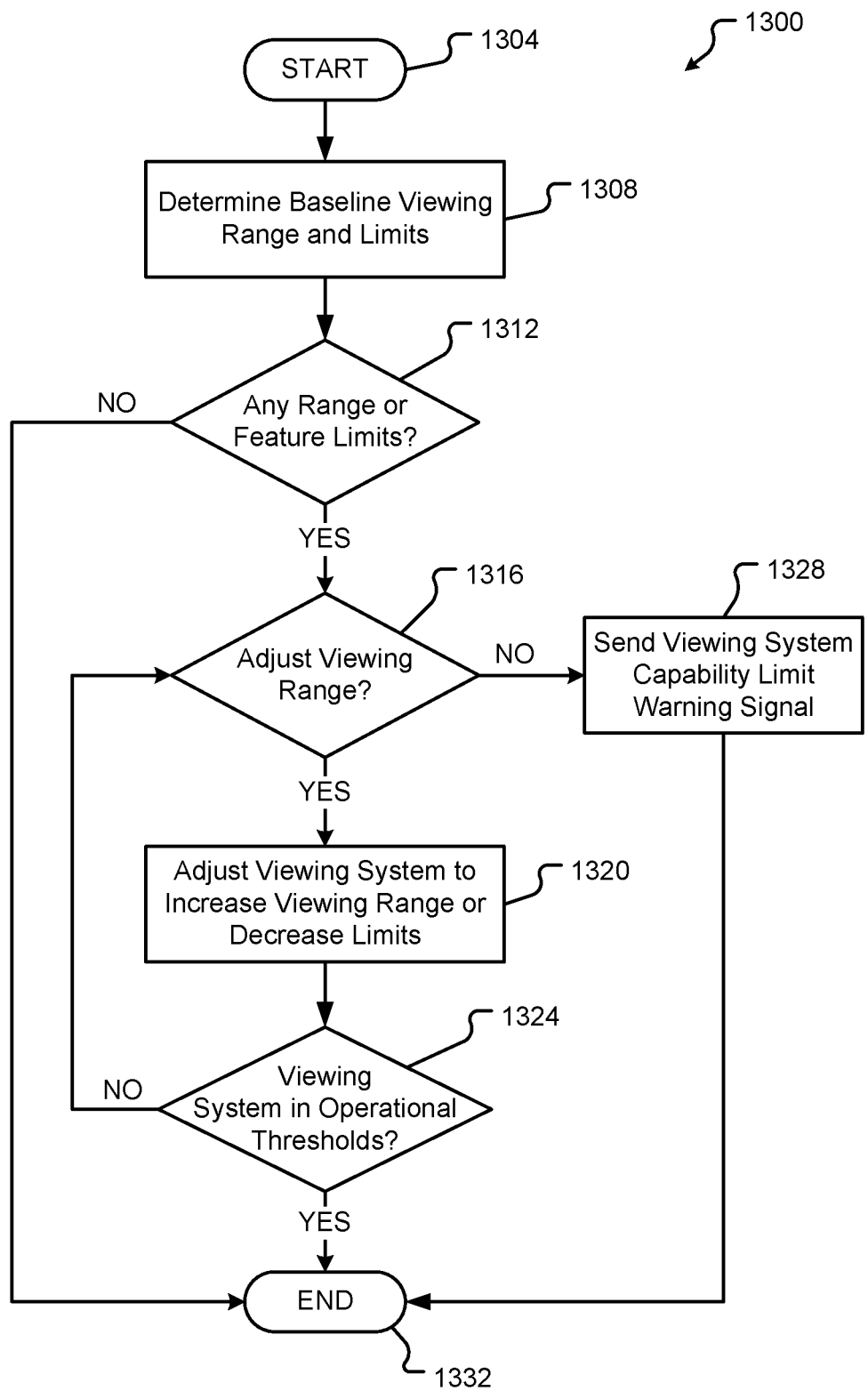
FIG. 13 is a flow diagram of a method for automatically adjusting a viewing capability of the low-profile imaging system in accordance with embodiments of the present disclosure.

FIG. 13 is a flow diagram of a method 1300 for automatically adjusting a viewing capability of the low-profile imaging system 800, 900 in accordance with embodiments of the present disclosure. While a general order for the steps of the method 1300 is shown in FIG. 13, the method 1300 can include more or fewer steps or can arrange the order of the steps differently than those shown in FIG. 13. Generally, the method 1300 starts with a start operation 1304 and ends with an end operation 1324. The method 1300 can be executed as a set of computer-executable instructions executed by a computer system and encoded or stored on a computer readable medium. Hereinafter, the method 1300 shall be explained with reference to the systems, components, assemblies, devices, user interfaces, environments, software, etc. described in conjunction with FIGS. 1-12.

The method 1300 begins at step 1304 and proceeds by determining a baseline viewing range and limits of the low-profile imaging system 800, 900 (step 1308). A baseline viewing range may be determined by emitting at least one pulse of light from the LIDAR sensor 320, 904 at various angles around a 360-degree viewing circle. The LIDAR sensor 320, 904 may then process the characteristics of any returned light (e.g., reflected echo, etc.) to determine a time of flight at the various angles. If the time of flight falls below a certain threshold there may be a viewing range or feature limit associated with the imaging system 800, 900.

Next, the method 1300 may continue by determining whether there are any range or feature limits associated with the imaging system 800, 900 (step 1312). As provided above, a viewing range or limit may be associated with a time of flight characteristic of a sensed environment. For example, when the time of flight falls below a certain threshold (e.g., indicating a target is detected inside an area or volume of the vehicle 100, etc.) there may be range or feature limit associated with the imaging system 800, 900. In some embodiments, the target detected may be an obstacle that is at least temporarily associated with a part of the vehicle 100. The obstacle may be some object that is in contact with or placed on a portion of the vehicle 100. Examples of these objects may include, but is in no way limited to, a bird sitting on the vehicle 100, a purse, cup of coffee, drink, and/or briefcase on a portion of the vehicle 100 (e.g., the roof 130 of the vehicle 100), etc., and/or combinations thereof. In some cases the obstacle may be some deformation or alteration of an object associated with the vehicle 100. For instance, a damaged body panel, aftermarket modification, accessory, etc., and/or combinations thereof may be an obstacle to the imaging system 800, 900. If no viewing range or features are limited, the method 1300 may end at step 1332.

However, in the event that at least one viewing range or features are determined to be limited, the method 1300 may proceed by determining whether the viewing range should be adjusted (step 1316). In some embodiments, the method 1300 may determine a location and/or position associated with the viewing range and/or feature limit. This location and/or position of the viewing range and/or feature limit may be determined based on information about the position of the light when emitted and reflected by the LIDAR sensor 320, 904 at a given area around the imaging system 800, 900. In the event that the viewing range or features of the imaging system 800, 900 are limited, the location and/or position associated with the viewing range and/or feature limitation may be used to determine a severity level of the limitation. Based on the severity level of the limitation, the method 1300 may determine to adjust the viewing system (e.g., when the severity level is within predetermined acceptable threshold values) at step 1320 or send a warning signal as described in conjunction with step 1328 (e.g., when the severity level is outside of predetermined acceptable threshold values).

The method 1300 may proceed to adjust the viewing system when the severity level of the limitation is acceptable (step 1320). In some embodiments, the method 1300 may adjust the viewing system by changing a position of at least one of the reflective elements. The change in position may include adjusting a horizontal or vertical position of at least one of the reflective elements. Additionally or alternatively, the change in position may include changing an angles of one or more the reflective elements. In some cases, the changes may only need to be made to a portion of the optics assembly and/or reflective surfaces. For instance, an obstruction may only be found across a portion of a viewing circle associated with a reflective surface of an imaging system 800, 900 having a MEMS mirror array. In this example, the angles of a subset of the mirrors in the MEMS mirror array (e.g., in a light path of the portion of the viewing circle having the limitation) may be adjusted to increase a viewing range and/or decrease an effect of the limitation. In this example, the other MEMS mirrors (e.g., outside of the light path of the portion of the viewing circle having the limitation) may be maintained in an original, unadjusted, or other position different from the adjusted position of the subset.

Next, the method 1300 may continue by determining whether the viewing system (e.g., the imaging system 800, 900) is functioning within predetermined operational thresholds (step 1324). In this step, the LIDAR sensor 320, 904 may emit at least one pulse of light at various angles around a 360-degree viewing circle to determine the modified viewing range and limits. For example, the LIDAR sensor 320, 904 may process the characteristics of any returned light to determine a time of flight at the various angles for the adjusted system. If the time of flight falls below a certain threshold there may still be a viewing range or feature limit associated with the imaging system 800, 900 and the method 1300 may return to step 1316. However, if the time of flight is within predetermined thresholds and there is little or no limitation to the viewing range of the imaging system 800, 900, the method 1300 may end at step 1332.

If the viewing range of the imaging system 800, 900 cannot be adjusted, or is unable to be adjusted within predetermined safety thresholds, the method 1300 may send a warning signal at step 1328. The warning signal may include transmitting a message to be rendered to a display of the vehicle 100. For instance, the message may instruct a user of the vehicle 100 to remove the detected obstacle from the vehicle 100. In another example, the message may inform a user of the vehicle 100 that the imaging system 800, 900 cannot function or allow certain driving functions (e.g., greater than Level 3 autonomous driving operations, etc.). In this example, the warning signal may be sent to a vehicle control system 348 to limit the driving functions. In any event, the vehicle 100 or operations of the vehicle 100 may be rendered inoperable until the viewing range limitation is remedied. The method 1300 ends at step 1332.

Any of the steps, functions, and operations discussed herein can be performed continuously and automatically.

The exemplary systems and methods of this disclosure have been described in relation to vehicle systems and electric vehicles. However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should, however, be appreciated that the present disclosure may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined into one or more devices, such as a server, communication device, or collocated on a particular node of a distributed network, such as an analog and/or digital telecommunications network, a packet-switched network, or a circuit-switched network. It will be appreciated from the preceding description, and for reasons of computational efficiency, that the components of the system can be arranged at any location within a distributed network of components without affecting the operation of the system.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infra-red data communications.

While the flowcharts have been discussed and illustrated in relation to a particular sequence of events, it should be appreciated that changes, additions, and omissions to this sequence can occur without materially affecting the operation of the disclosed embodiments, configuration, and aspects.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and/or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights, which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

Embodiments include an imaging and ranging system for a vehicle, comprising: a sensor configured to emit laser light about a periphery thereof; a first reflective element disposed around the sensor and including a first reflective surface in an optical path of the laser light emitted from the sensor, wherein the first reflective surface forms a continuous and uninterrupted reflective region around a complete periphery of the first reflective element, and wherein the first reflective surface is configured to direct the laser light emitted from the sensor at an angle of reflection and direction away from the sensor; and a second reflective element disposed around the sensor and including a second reflective surface in an optical path of the directed laser light, wherein the second reflective surface is configured to guide the directed laser light reflected by the first reflective surface at a same angle of reflection and direction as the laser light emitted from the sensor.

Aspects of the above imaging and ranging system include wherein the sensor is a light imaging detection and ranging (LIDAR) system. Aspects of the above imaging and ranging system include wherein the second reflective surface forms a continuous and uninterrupted reflective region around a complete periphery of the second reflective element. Aspects of the above imaging and ranging system include wherein a shape of the first reflective element around the sensor substantially matches a shape of the second reflective element around the sensor. Aspects of the above imaging and ranging system include wherein the second reflective element is disposed above the first reflective element. Aspects of the above imaging and ranging system include wherein at least one of the first reflective surface and/or the second reflective surface is adjustable relative to an angle of the laser light emitted from the sensor. Aspects of the above imaging and ranging system include wherein an angle of incidence for the laser light emitted by the sensor is adjustable relative to the first reflective surface. Aspects of the above imaging and ranging system include wherein the first reflective surface is adjustable relative to an angle of the laser light emitted from the sensor via pivoting a mount for the first reflective surface. Aspects of the above imaging and ranging system include wherein the second reflective surface is adjustable relative to an angle of the laser light emitted from the sensor via pivoting a mount for the second reflective surface. Aspects of the above imaging and ranging system include wherein at least one of the first reflective surface and/or the second reflective surface is adjustable via an oscillating motion subjected to a mount for the at least one of the first reflective surface and/or the second reflective surface. Aspects of the above imaging and ranging system further comprise: a housing, comprising: a base having a rigid planar area; a first support member attached to a periphery of the base; and an optics shield formed around the periphery of the base and supported by the first support member; wherein the sensor is attached to the base in a central portion of the rigid planar area, and wherein the first and second reflective elements are disposed inside the housing. Aspects of the above imaging and ranging system include wherein the shape of the housing conforms to a shape of the roof and matches a draft angle of the vehicle. Aspects of the above imaging and ranging system include wherein a shape of the first reflective element around the sensor is substantially rectangular having rounded corners.

Embodiments include a vehicle, comprising: a frame having one or more body panels mounted thereto, wherein at least one of the body panels is a roof disposed on a top portion of the vehicle; and a light imaging detection and ranging (LIDAR) system attached to the roof of the vehicle the LIDAR system, comprising: a sensor configured to emit laser light about a periphery thereof; a first reflective element disposed around the sensor and including a first reflective surface in an optical path of the laser light emitted from the sensor, wherein the first reflective surface forms a continuous and uninterrupted reflective region around a complete periphery of the first reflective element, and wherein the first reflective surface is configured to direct the laser light emitted from the sensor at an angle of reflection and direction away from the sensor; and a second reflective element disposed around the sensor and including a second reflective surface in an optical path of the directed laser light, wherein the second reflective surface is configured to guide the directed laser light reflected by the first reflective surface at a same angle of reflection and direction as the laser light emitted from the sensor.

Aspects of the above imaging and ranging system include wherein the second reflective surface forms a continuous and uninterrupted reflective region around a complete periphery of the second reflective element. Aspects of the above imaging and ranging system include wherein a shape of the first reflective element around the sensor substantially matches a shape of the second reflective element around the sensor, and wherein the second reflective element is disposed above the first reflective element. Aspects of the above imaging and ranging system include wherein at least one of the first reflective surface and/or the second reflective surface is adjustable relative to an angle of the laser light emitted from the sensor. Aspects of the above imaging and ranging system include wherein the LIDAR system further comprises: a housing, comprising: a base having a rigid planar area; a first support member attached to a periphery of the base; and an optics shield formed around the periphery of the base and supported by the first support member; wherein the sensor is attached to the base in a central portion of the rigid planar area, and wherein the first and second reflective elements are disposed inside the housing. Aspects of the above imaging and ranging system include wherein the shape of the housing conforms to a shape of the roof and matches a draft angle of the vehicle.

Embodiments include a low-profile imaging system for a vehicle, comprising: a roof-mounted integrated light imaging detection and ranging (LIDAR) system comprising: a laser light generator configured to emit laser light about a periphery thereof; and a photodiode receiver configured to detect reflected laser light returned to the LIDAR system from the emitted laser light reflecting off an object in a target area; a first reflective element disposed around the LIDAR system and including a first reflective surface in an optical path of the laser light emitted from the laser light generator, wherein the first reflective surface forms a continuous and uninterrupted reflective region around a complete periphery of the first reflective element, and wherein the first reflective surface is configured to direct the laser light emitted from the laser light generator at an angle of reflection and direction away from the LIDAR system; and a second reflective element disposed around the sensor and including a second reflective surface in an optical path of the directed laser light, wherein the second reflective surface is configured to guide the directed laser light reflected by the first reflective surface at a same angle of reflection and direction as the laser light emitted from the laser light generator.

Any one or more of the aspects/embodiments as substantially disclosed herein.

Any one or more of the aspects/embodiments as substantially disclosed herein optionally in combination with any one or more other aspects/embodiments as substantially disclosed herein.

One or means adapted to perform any one or more of the above aspects/embodiments as substantially disclosed herein.

The phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an embodiment that is entirely hardware, an embodiment that is entirely software (including firmware, resident software, micro-code, etc.) or an embodiment combining software and hardware aspects that may all generally be referred to herein as a "circuit," "module," or "system." Any combination of one or more computer-readable medium(s) may be utilized. The computer-readable medium may be a computer-readable signal medium or a computer-readable storage medium.

A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable medium may be transmitted using any appropriate medium, including, but not limited to, wireless, wireline, optical fiber cable, RF, etc., or any suitable combination of the foregoing.

The terms "determine," "calculate," "compute," and variations thereof, as used herein, are used interchangeably and include any type of methodology, process, mathematical operation or technique.

The term "electric vehicle" (EV), also referred to herein as an electric drive vehicle, may use one or more electric motors or traction motors for propulsion. An electric vehicle may be powered through a collector system by electricity from off-vehicle sources, or may be self-contained with a battery or generator to convert fuel to electricity. An electric vehicle generally includes a rechargeable electricity storage system (RESS) (also called Full Electric Vehicles (FEV)). Power storage methods may include: chemical energy stored on the vehicle in on-board batteries (e.g., battery electric vehicle or BEV), on board kinetic energy storage (e.g., flywheels), and/or static energy (e.g., by on-board double-layer capacitors). Batteries, electric double-layer capacitors, and flywheel energy storage may be forms of rechargeable on-board electrical storage.

The term "hybrid electric vehicle" refers to a vehicle that may combine a conventional (usually fossil fuel-powered)

powertrain with some form of electric propulsion. Most hybrid electric vehicles combine a conventional internal combustion engine (ICE) propulsion system with an electric propulsion system (hybrid vehicle drivetrain). In parallel hybrids, the ICE and the electric motor are both connected to the mechanical transmission and can simultaneously transmit power to drive the wheels, usually through a conventional transmission. In series hybrids, only the electric motor drives the drivetrain, and a smaller ICE works as a generator to power the electric motor or to recharge the batteries. Power-split hybrids combine series and parallel characteristics. A full hybrid, sometimes also called a strong hybrid, is a vehicle that can run on just the engine, just the batteries, or a combination of both. A mid hybrid is a vehicle that cannot be driven solely on its electric motor, because the electric motor does not have enough power to propel the vehicle on its own.

The term "rechargeable electric vehicle" or "REV" refers to a vehicle with on board rechargeable energy storage, including electric vehicles and hybrid electric vehicles.

What is claimed is:

1. An imaging and ranging system for a vehicle, comprising:
   a sensor configured to emit laser light about a periphery thereof;
   a first reflective element disposed around the sensor and including a first reflective surface in an optical path of the laser light emitted from the sensor, wherein the first reflective surface forms a continuous and uninterrupted reflective region around a complete periphery of the first reflective element; and wherein the first reflective surface is configured to direct the laser light emitted from the sensor at an angle of reflection and direction away from the sensor; and
   a second reflective element disposed around the sensor and including a second reflective surface in an optical path of the directed laser light, wherein the second reflective surface is configured to guide the directed laser light reflected by the first reflective surface at a same angle of reflection and direction as the laser light emitted from the sensor.

2. The imaging and ranging system of claim 1, wherein the sensor is a light imaging detection and ranging (LIDAR) system.

3. The imaging and ranging system of claim 2, wherein the second reflective surface forms a continuous and uninterrupted reflective region around a complete periphery of the second reflective element.

4. The imaging and ranging system of claim 3, wherein a shape of the first reflective element around the sensor matches a shape of the second reflective element around the sensor.

5. The imaging and ranging system of claim 4, wherein the second reflective element is disposed above the first reflective element.

6. The imaging and ranging system of claim 5, wherein at least one of the first reflective surface and the second reflective surface is adjustable relative to an angle of the laser light emitted from the sensor.

7. The imaging and ranging system of claim 5, wherein an angle of incidence for the laser light emitted by the sensor is adjustable relative to the first reflective surface.

8. The imaging and ranging system of claim 5, wherein the first reflective surface is adjustable relative to an angle of the laser light emitted from the sensor via pivoting a mount for the first reflective surface.

9. The imaging and ranging system of claim 5, wherein the second reflective surface is adjustable relative to an angle of the laser light emitted from the sensor via pivoting a mount for the second reflective surface.

10. The imaging and ranging system of claim 5, wherein at least one of the first reflective surface and the second reflective surface is adjustable via an oscillating motion subjected to a mount for the at least one of the first reflective surface and the second reflective surface.

11. The imaging and ranging system of claim 5, further comprising:
   a housing, comprising:
      a base having a rigid planar area;
      a first support member attached to a periphery of the base; and
      an optics shield formed around the periphery of the base and supported by the first support member;
   wherein the sensor is attached to the base in a central portion of the rigid planar area, and wherein the first and second reflective elements are disposed inside the housing.

12. The imaging and ranging system of claim 11, wherein the shape of the housing conforms to a shape of a roof and matches a draft angle of the vehicle.

13. The imaging and ranging system of claim 12, wherein a shape of the first reflective element around the sensor is substantially rectangular having rounded corners.

14. A vehicle comprising:
   a frame having one or more body panels mounted thereto, wherein at least one of the one or more body panels is a roof disposed on a top portion of the vehicle; and
   a light imaging detection and ranging (LIDAR) system attached to the roof of the vehicle the LIDAR system, comprising:
      a sensor configured to emit laser light about a periphery thereof;
      a first reflective element disposed around the sensor and including a first reflective surface in an optical path of the laser light emitted from the sensor, wherein the first reflective surface forms a continuous and uninterrupted reflective region around a complete periphery of the first reflective element, and wherein the first reflective surface is configured to direct the laser light emitted from the sensor at an angle of reflection and direction away from the sensor; and
      a second reflective element disposed around the sensor and including a second reflective surface in an optical path of the directed laser light, wherein the second reflective surface is configured to guide the directed laser light reflected by the first reflective surface at a same angle of reflection and direction as the laser light emitted from the sensor.

15. The vehicle of claim 14, wherein the second reflective surface forms a continuous and uninterrupted reflective region around a complete periphery of the second reflective element.

16. The vehicle of claim 15, wherein a shape of the first reflective element around the sensor matches a shape of the second reflective element around the sensor, and wherein the second reflective element is disposed above the first reflective element.

17. The vehicle of claim 16, wherein at least one of the first reflective surface and the second reflective surface is adjustable relative to an angle of the laser light emitted from the sensor.

18. The vehicle of claim 16, wherein the LIDAR system further comprises:
a housing, comprising:
a base having a rigid planar area;
a first support member attached to a periphery of the base; and
an optics shield formed around the periphery of the base and supported by the first support member;
wherein the sensor is attached to the base in a central portion of the rigid planar area, and wherein the first and second reflective elements are disposed inside the housing.

19. The vehicle of claim 18, wherein the of the housing conforms to a shape of the roof and matches a draft angle of the vehicle.

20. A low-profile imaging system for a vehicle, comprising:
a roof-mounted integrated light imaging detection and ranging (LIDAR) system comprising:
a laser light generator configured to emit laser light about a periphery thereof; and
a photodiode receiver configured to detect reflected laser light returned to the LIDAR system from the emitted laser light reflecting off an object in a target area;
a first reflective element disposed around the LIDAR system and including a first reflective surface in an optical path of the laser light emitted from the laser light generator, wherein the first reflective surface forms a continuous and uninterrupted reflective region around a complete periphery of the first reflective element, and wherein the first reflective surface is configured to direct the laser light emitted from the laser light generator at an angle of reflection and direction away from the LIDAR system; and
a second reflective element disposed around the LIDAR system and including a second reflective surface in an optical path of the directed laser light, wherein the second reflective surface is configured to guide the directed laser light reflected by the first reflective surface at a same angle of reflection and direction as the laser light emitted from the laser light generator.

* * * * *

UNITED STATES PATENT AND TRADEMARK OFFICE
CERTIFICATE OF CORRECTION

PATENT NO. : 11,034,335 B2  
APPLICATION NO. : 15/394402  
DATED : June 15, 2021  
INVENTOR(S) : Austin L. Newman Page 1 of 1

It is certified that error appears in the above-identified patent and that said Letters Patent is hereby corrected as shown below:

In the Claims

Claim 1, Column 37, Line 32, delete the ";" and insert a --,-- therein.
Claim 19, Column 39, Line 14, delete "wherein the of the housing" and insert --wherein the shape of the housing-- therein.

Signed and Sealed this  
Twenty-fourth Day of August, 2021

Drew Hirshfeld  
*Performing the Functions and Duties of the*  
*Under Secretary of Commerce for Intellectual Property and*  
*Director of the United States Patent and Trademark Office*